(12) United States Patent
Chau et al.

(10) Patent No.: US 11,411,940 B2
(45) Date of Patent: Aug. 9, 2022

(54) ZERO-KNOWLEDGE PROOF NETWORK PROTOCOL FOR N-PARTY VERIFICATION OF SHARED INTERNET OF THINGS ASSETS

(71) Applicants: AT&T Global Network Services Hong Kong LTD, Island East (HK); AT&T Mobility II LLC, Atlanta, GA (US)

(72) Inventors: Winnie Chau, Hong Kong (HK); John Philip Mulligan, Island South (HK); Shashi Gowda, Lantau Island (HK)

(73) Assignees: AT&T Global Network Services Hong Kong LTD, Hong Kong (HK); AT&T Mobility II LLC, Atlanta, GA (US)

( * ) Notice: Subject to any disclaimer, the term of this patent is extended or adjusted under 35 U.S.C. 154(b) by 374 days.

(21) Appl. No.: 16/722,586

(22) Filed: Dec. 20, 2019

(65) Prior Publication Data

US 2021/0194861 A1 Jun. 24, 2021

(51) Int. Cl.
*H04L 29/06* (2006.01)
*H04L 9/40* (2022.01)
*H04L 9/06* (2006.01)
*H04L 69/166* (2022.01)
*H04L 12/66* (2006.01)
*H04L 9/32* (2006.01)
*G06F 21/64* (2013.01)

(52) U.S. Cl.
CPC ........ *H04L 63/0485* (2013.01); *H04L 9/0643* (2013.01); *H04L 9/3221* (2013.01); *H04L 12/66* (2013.01); *H04L 63/123* (2013.01); *H04L 69/166* (2013.01); *G06F 21/64* (2013.01)

(58) Field of Classification Search
CPC ... G06F 21/64; G06F 21/645; H04L 63/0485; H04L 9/0643; H04L 9/3221; H04L 12/66; H04L 63/12; H04L 63/123; H04L 63/126; H04L 69/166
See application file for complete search history.

(56) References Cited

U.S. PATENT DOCUMENTS

| | | | |
|---|---|---|---|
| 7,770,015 B1 * | 8/2010 | Goldman | H04L 9/3236 713/180 |
| 9,251,097 B1 * | 2/2016 | Kumar | G06F 11/1464 |
| 10,366,315 B1 * | 7/2019 | Kumar | G06F 16/93 |
| 2013/0179947 A1 * | 7/2013 | Kline, III | H04L 67/28 726/4 |
| 2013/0268771 A1 * | 10/2013 | Blankenbeckler | G11B 20/00115 713/189 |
| 2018/0063159 A1 * | 3/2018 | Naughton-Green | H04L 9/3271 |

(Continued)

*Primary Examiner* — Malcolm Cribbs
(74) *Attorney, Agent, or Firm* — Hartman & Citrin LLC

(57) ABSTRACT

A data source device ("device") can generate a plurality of data segments, each of which can include data that is owned by a specific entity. The device can calculate and store a hash for each data segment of the plurality of data segments as part of a message footer of a data message. The device can calculate and store a further hash that includes a combination of the plurality of data segments and the hashes for the plurality of data segments as part of the message footer. The device can encrypt each data segment to create a plurality of encrypted data segments. The device can assemble the data message to include the plurality of encrypted data segments and the message footer. The device can send the data message to a gateway for further processing.

20 Claims, 23 Drawing Sheets

(56) References Cited

U.S. PATENT DOCUMENTS

2018/0130158 A1* 5/2018 Atkinson ............ G06F 21/6209
2019/0044726 A1* 2/2019 Madeira .............. H04L 41/5003
2020/0099531 A1* 3/2020 Chidambaram ............................
                                                      G06Q 10/06315

* cited by examiner

ZERO-KNOWLEDGE PROOF NETWORK PROTOCOL FOR N-PARTY VERIFICATION OF SHARED INTERNET OF THINGS ASSETS

BACKGROUND

Standard Internet of Things ("IoT") devices are typically designed with sensors as a single working unit, often tightly coupled during the engineering process. This includes the choice of specific sensors with a predetermined component level integration in mind as well as overall device application and operation. This integration makes any level of sensor separation impractical from both an engineering as well as a commercial perspective. Any sensor modification often can involve not only the redesign from a hardware, software, and quality process, but also new certification, fabrication, and production processes. This results in IoT devices that are either highly specialized or overly generic, forcing a high cost of solution ownership and often unachievable return on investment ("ROI"). Some device manufacturers do support limited sensor choice, but the range is strictly bounded and not flexible because of the device's overall tight integration with a business analytics framework.

In a typical IoT deployment, there is a tendency to conflate IoT device ownership with IoT data ownership. This limits the potential for large numbers of emerging technology opportunities, which require shared, fragmented ownership of the IoT data that an individual IoT device generates. As an example, consider that an asset to be monitored is a refrigerated shipping container with an IoT subscriber identity module ("SIM")-based device that has been deployed as part of a fleet. In this scenario, three potential data owners can be identified: (1) the network SIM provider; (2) the container owner; and (3) the container manufacturer. Each party has a vested interested in access to certain fragments of the IoT data that can be generated by the IoT device. The network company may require information about cell-id, radio access technology, network latency, and/or other pieces of network data required to meet their data governance and regulatory requirements. The container owner may need information related to the environmental conditions of the container. The container manufacturer may need information related to the operational condition of the container for service level objectives and actuarial services as well as predictive maintenance purposes. In this multi-party data ownership ("MPDO") scenario, the challenge is how to provide each party only the data segment they own from individual IoT messages without exposing any particular data from any data segment owned by any other party member, and also ensuring the overall integrity of the data message itself. This problem heretofore has not been observed, and thus no solutions exist.

SUMMARY

Concepts and technologies disclosed herein are directed to aspects of a zero-knowledge proof network protocol for n-party verification of data. According to one aspect of the concepts and technologies disclosed herein, a data source device can generate a plurality of data segments, each of which can include data that is owned by a specific entity. The data source device can calculate and store a hash for each data segment of the plurality of data segments as part of a message footer of a data message. The data source device can calculate and store a further hash that includes a combination of the plurality of data segments and the hashes for the plurality of data segments as part of the message footer. The data source device can encrypt each data segment to create a plurality of encrypted data segments. The data source device can assemble the data message to include the plurality of encrypted data segments and the message footer. The data source device can send the data message to a gateway for further processing.

In some embodiments, the specific entity is or includes a network owner. In other embodiments, the specific entity is or includes a device owner, such as an owner of the data source device. In some other embodiments, the specific entity is or includes a third party owner, such as an enterprise other than the network owner and the device owner.

In some embodiments, the data source device can include one or more sensors. In these embodiments, the data source device can generate the plurality of data segments based upon output from the sensor(s). In some embodiments, the data source device is or includes an IoT device. In other embodiments, the data source is or includes a combined device that combines an IoT device and an IoT asset, which is being monitored by the IoT device (also referred to herein as "device+asset").

In some embodiments, the plurality of data segments can include a first data segment associated with a network owner, a second data segment associated with a device owner, and a third data segment associated with a third party owner. Each data segment can be independently hashed and then encrypted with a key associated with the data owner. Each individual data segment hash can be stored in the message footer, along with a hash of the entire data message. The gateway can include a network gateway associated with the network owner. The network gateway can receive the data message and can verify the hash of the entire data message. The network gateway can decrypt, using a first key, a first encrypted data segment of the plurality of data segments associated with the network owner to obtain the first data segment. The network gateway can verify the integrity of the first data segment by hashing the first data segment and comparing it to the hash of the first data segment, which was included in the message footer. The network gateway can send a modified data message to a device gateway. The modified message can include a further hash of the modified data message, a second encrypted data segment associated with the device owner, and a third encrypted data segment associated with the third party owner. The device gateway can decrypt, using a second key, the second encrypted data segment associated with the device owner to obtain the second data segment. The device gateway can send a second modified data message to a third party gateway. The second modified message can include the further hash and the third encrypted data segment associated with the third party owner. The third party gateway can decrypt, using a third key, the third encrypted data segment associated with the third party owner to obtain the third data segment. The various gateways can verify an integrity of the data message, the modified data message, and/or the second modified data message.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

A network protocol disclosed herein allows for multi-party data ownership ("MPDO") of Internet of Things ("IoT") data generated by a single device. The primary challenge with an MPDO solution is protecting individual party data while maintaining overall data integrity of specific data messages. The network protocol disclosed herein allows for both the secure per-party encryption of IoT data while simultaneously allowing all parties to absolutely verify the overall data message despite only having visibility to their particular segment of the message. This innovation is achieved through the design of a zero-knowledge proof that provides an overlay to an end-to-end data pipeline that begins with the IoT device and ends at each of the respective data owners securely receiving their particular segment of an IoT data message. As emerging technology demand continues to push globally, there is a growing need for a solution that allows MPDO for complex use cases across a range of industries, such as, but not limited to, supply chain, smart health, smart cities, financial technologies, and next generation actuarial services. The concepts and technologies disclosed herein can exponentially increase both the number of potential use cases of an emerging technology opportunity, as well as the overall use case viability by providing a layer of trust and security that does not exist in the market today.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1A:
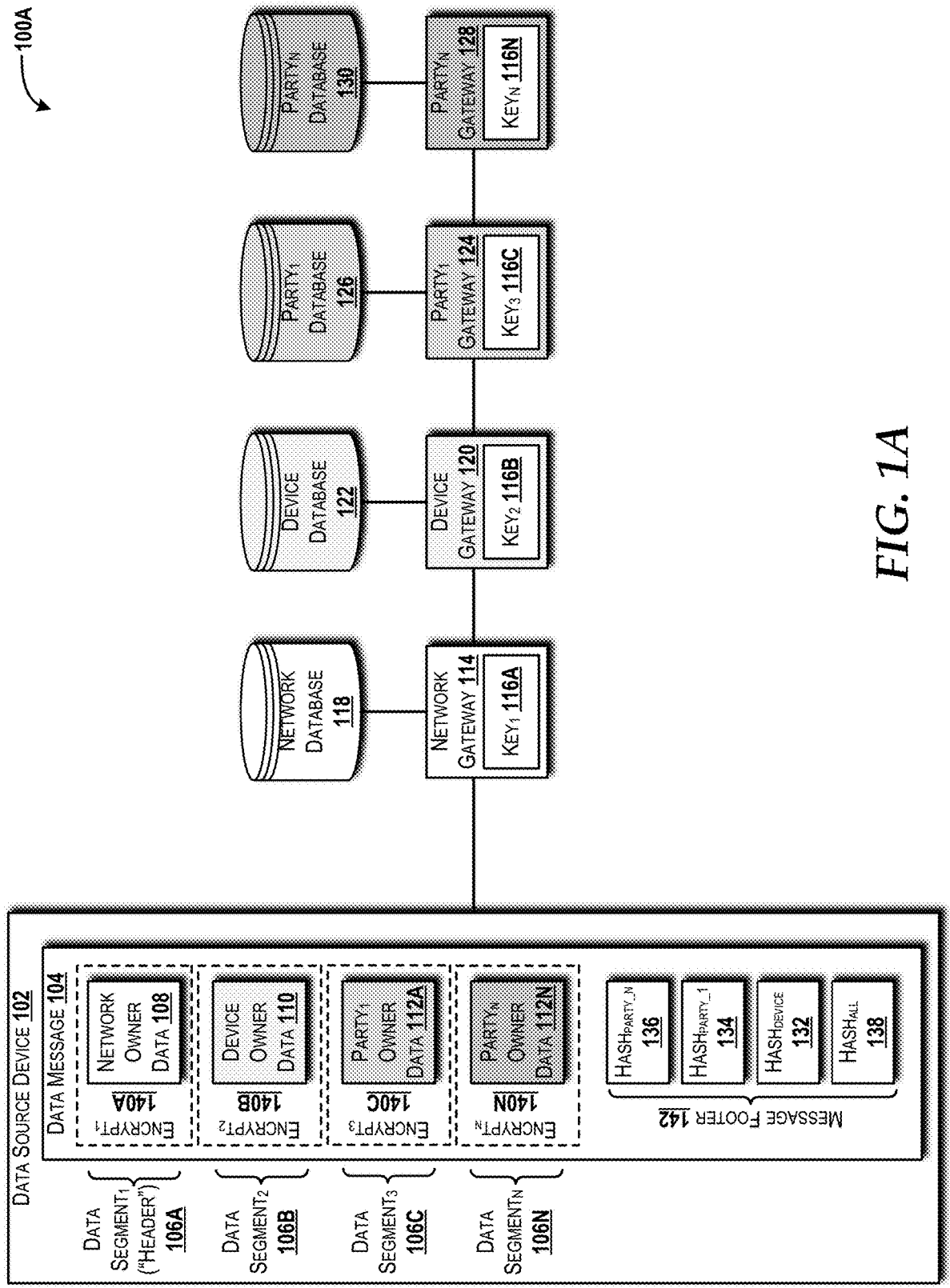
FIGS. 1A-1E are block diagrams illustrating aspects of an illustrative operating environment in different configurations and in which various concepts and technologies disclosed herein can be implemented.

FIGS. 1A-1E illustrate an operating environment 100A-100E in which various concepts and technologies disclosed herein can be implemented. Turning first to FIG. 1A, the operating environment 100A includes a data source device 102 that can create an MPDO data message 104 (hereinafter "data message 104") that contains a plurality of data segments 106A-106N, each of which is owned by a different party. The data message 104 can be sent to any number ("N") of parties. The term "owner," as used herein, is the party/entity within a data message flow that has proprietary ownership of one or more data segments 106 of the data message 104 generated by the data source device 102. In the illustrated example, the data segment$_1$ 106A is owned by a network provider or network owner, and includes network owner data 108 (also referred to herein, at times, as "NOD"); the data segment$_2$ 106B is owned by a device manufacturer or device owner, and includes device owner data 110 (also referred to herein, at times, as "DOD"); and the data segments$_{3-n}$ 106C-106N are owned by different third parties, and include party$_1$ owner data 112A and party$_n$ owner data 112N (also referred to herein as POD$_1$ and POD$_N$, respectively). The data source device 102 can provide an encrypted version of the data message 104 (hereinafter "encrypted data message 104" as will be described in greater detail below) to each owner in a sequence, and each owner can decrypt and consume their encrypted version of their respective data segment 106. In the illustrated embodiment, the data source device 102 can send the encrypted data message 104' to a network gateway 114 that can decrypt the network owner data 108 in the data segment$_1$ 106A via a key$_1$ 116A, and can store the decrypted network owner data 108 in a network database 118. The network gateway 114, in turn, can provide a modified version of the encrypted data message 104' (i.e., the encrypted data message 104' with the network owner data 108 removed) to a device gateway 120 that can decrypt the device owner data 110 in the data segment$_2$ 106B via a key$_2$ 116B, and can store the decrypted device owner data 110 in a device database 122. The device gateway 120, in turn, can provide a modified version of the encrypted data message 104' (i.e., the encrypted data message 104' with the network owner data 108 and the device owner data 110 removed) to a party$_1$ gateway 124 that can decrypt the party$_1$ owner data 112A in the data segment$_3$ 106C via a key$_3$ 116C, and can store the decrypted party$_1$ owner data 112A in a party$_1$ database 126. The party$_1$ gateway 124, in turn, can provide a modified version of the encrypted data message 104' (i.e., the encrypted data message 104 with the network owner data 108, the device owner data 110, and the party$_1$ owner data 112A removed) to a party$_n$ gateway 128 that can decrypt the party$_n$ owner data 112N in the data segment$_n$ 106N via a key$_n$ 116N, and can store the decrypted party$_n$ owner data 112N in a party$_n$ database 130. This message flow is based upon a zero-knowledge proof that can be integrated into a network communications protocol. The specific sequence shown in the illustrated embodiment is merely an example and should not be construed as being limiting in any way. Additional details regarding each of the gateways 114, 120, 124, 128 and their corresponding databases 118, 122, 126, 130 will be described in greater detail below.

The data source device 102 can be any type of device that is capable of generating and/or collecting data (e.g., from one or more sensors). The data can be owned by a plurality of owners such as described above. In some embodiments, the data source device 102 is or includes an IoT device, an example of which is illustrated and described in further detail with reference to FIG. 15. The IoT device can be a non-programmable or programmable IoT device. In some other embodiments, the data source device 102 is or includes a combination of an IoT device and an asset of some sort. An example of a combined IoT device and asset also is described with reference to FIG. 15. An asset can be an autonomous agent that meets the definition of a "machine" in accordance with machine-to-machine ("M2M") standards. As such, the asset can be a computing element with a network interface. The asset alternatively can be or can include, but is not limited to, a product or good, a box that contains one or more products/goods, a cargo box that contains one or more products/goods, a pallet that contains one or more cargo boxes, or a container that contains at least one pallet. The type of asset should not be limited in any way. Moreover, the industries to which the concepts and technologies disclosed herein may be applied should not be limited in any way.

The data source device 102 can generate data for each party/data owner as the separate data segments 106A-106N.

The data source device 102 can then perform a process to generate a hash of each of the data segments 106B-106N. In particular, the data source device 102 can generate a hash$_{device}$ 132 of the device owner data 110, a hash$_{party\_1}$ 134 of the party$_1$ owner data 112A, and a hash$_{party\_n}$ 136 of the party$_n$ owner data 112N. The data source device 102 also creates a hash$_{all}$ 138 of all data segments 106A-106N, including hashes of the network owner data 108, the device owner data 110, the party$_1$ owner data 112A, and the party$_n$ owner data 112N. The data source device 102 can generate the hashes 132, 134, 136, 138 using any hash function, including cyclic redundancy checks ("CRC") (e.g., CRC32), checksum functions, and cryptographic hash functions.

After the data source device 102 generates the hashes 132, 134, 136, 138, the data source device 102 can encrypt the data segments 106A-106N. In particular, the data source device 102 can encrypt the data segment 106A containing the network owner data 108 using a first encryption (shown as "encrypt$_1$") 140A, the data segment$_3$ 106B containing the device owner data 110 using a second encryption (shown as "encrypt$_2$") 140B, the data segment$_3$ 106C containing the party$_1$ owner data 112A using a third encryption (shown as "encrypt$_3$") 140C, and the data segment$_n$ 106N containing the party$_n$ owner data 112N using an $n^{th}$ encryption (shown as "encrypt$_n$") 140N. The data source device 102 also can create a message footer 142 that includes a combination of the hashes 132, 134, 136, 138.

The data source device 102 can then assemble the data message 104 by adding each of the data segments 106A-106N that have been encrypted by the encryptions 140A-140N, respectively. The data segment 106A can be or can include a message header to be used by the network gateway 114 for routing the data message 104, for example, to the network gateway 114, which can decrypt the network owner data 108 (e.g., routing data) using the key$_1$ 116A. The other parties can use their respective gateways 120, 124, 128 to generate a new header (best shown in FIGS. 1B-1E) to route the data message 104 to the next stop in the message flow sequence. The data source device 102 can add the message footer 142 to the data message 104 to complete the message assembly process.

After the data message 104 is assembled, the data source device 102 can route the data message 104 to the network gateway 114. Although the network gateway 114 is shown in the illustrated example, the network gateway 114 is an optional entity. The network gateway 114 is the only entity along the data message flow that is allowed to intercept the data message 104 before the device owner (via the device gateway 120). In some embodiments, the network gateway 114 is a federation platform with each of the other gateways—the device gateway 120, the party$_1$ gateway 124, and the party$_n$ gateway 128—operating as enterprise edge platforms ("EEP") individually owned by a different enterprise. The EEPs provide a demilitarized zone ("DMZ")-hosted, enterprise-specific data exchange that functions as a bridge between a public blockchain and a private pegged side chain.

Each of the gateways 114, 120, 124, 128 can receive the data message 104 in sequence of a data message flow, consume the routing header (e.g., the network owner data 108 for the network gateway 114, and a new routing header for each additional participating gateway in the sequence; this is best shown in FIGS. 1B-1E), use the respective keys 116A-116N to decrypt the respective data segments 106A-106N, and generate a hash (e.g., CRC32 or other described above) of the respective decrypted data segments 106A-106N. Each gateway 114, 120, 124, 128 can then acknowledge the data message 104 (e.g., via an ACK message), and can include the newly-generated hash in the ACK message. If a downstream party acknowledges the data message 104 with a hash, the data message 104 can be considered verified and can be passed to the next party upstream (e.g., the device gateway 120 to the $party_1$ gateway 124, and so on in the sequence). The sequence can be determined by the device owner associated with the device gateway 120. In the illustrated example, the sequence of the network gateway 114 to the device gateway 120, the device gateway 120 to the $party_1$ gateway 124, and the $party_1$ gateway 124 to the $party_n$ gateway 128 is used throughout the FIGS. 1A-1E. This example sequence should not be construed as being limiting in any way.

Figure 1B:
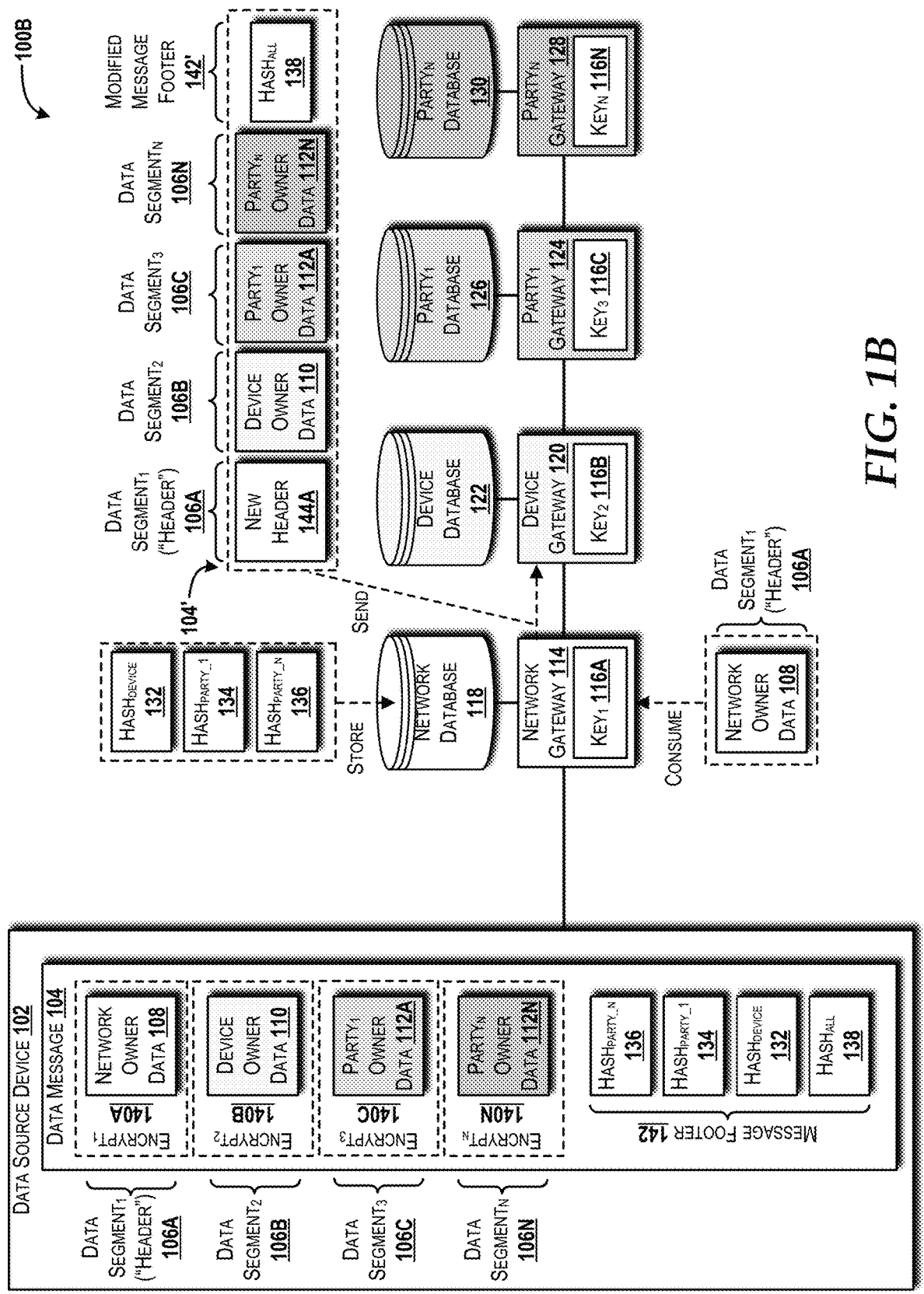

Turning now to FIG. 1B, the operating environment 100B is shown after the data source device 102 has sent the data message 104 to the network gateway 114. The network gateway 114 can consume and decrypt, using the key' 116A, the $data\ segment_1$ 106A containing the network owner data 108. In this manner, the network owner data 108 is removed from the data message 104. The network gateway 114 also can remove the $hash_{device}$ 132, the $hash_{party\_1}$ 134, and the $hash_{party\_n}$ 136 from the message footer 142, and can store these values in the network database 118. The modified message footer 142' includes only the $hash_{all}$ 138. The network gateway 114 can then generate a new header 144A to be included in the $data\ segment_1$ 106A of a modified version of the data message 104 ("modified data message 104"). The new header 144A can include routing data for the next destination in the sequence (i.e., the device gateway 120 in the illustrated example). The other data segments 106B-106N are left unchanged since the network gateway 114 does not include any of the keys 116B-116N required to decrypt these data segments 106B-106N.

Figure 1C:
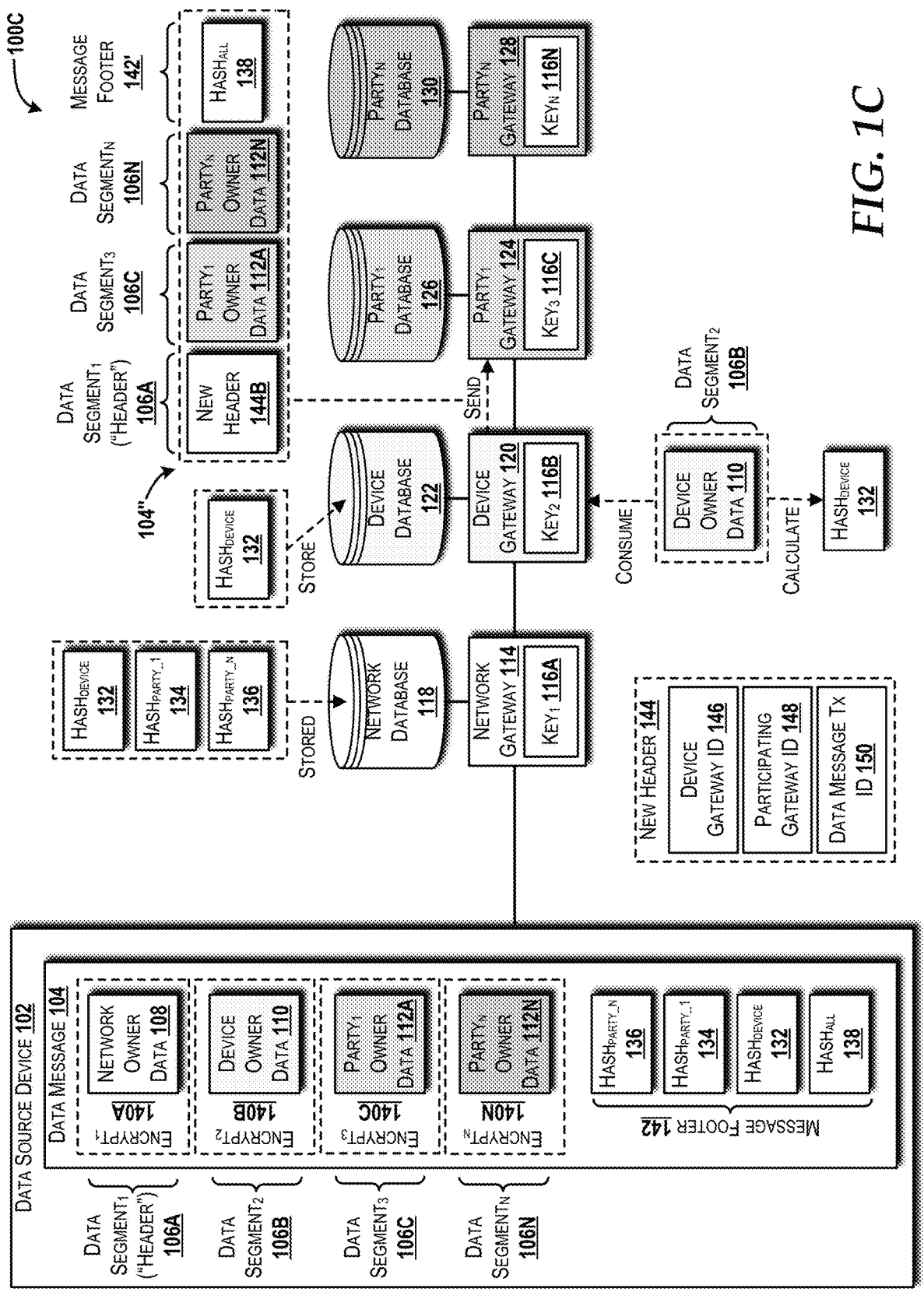

Turning now to FIG. 1C, the operating environment 100C is shown after the network gateway 114 has sent the modified data message 104' to the device gateway 120. The device gateway 120 can consume and decrypt, using the $key_2$ 116B, the $data\ segment_2$ 106B containing the device owner data 110. In this manner, the device owner data 110 is removed from the modified data message 104'. The device gateway 120 also can calculate the $hash_{device}$ 132 from hashing the device owner data 110 using the same hash function as the data source device 102. In some embodiments, the hash function to be used can be provided as part of the $data\ segment_1$ 106A. Alternatively, the hash function can be agreed upon by all parties beforehand. The device gateway 120 can store the $hash_{device}$ 132 in the device database 122. The modified message footer 142' remains unchanged with only the $hash_{all}$ 138. The device gateway 120 can then generate another new header 144B to be included in the data segment 106A of another modified version of the data message 104 (shown as modified data message 104"). The new header 144B can include a device gateway identifier ("ID") 146 that uniquely identifies the device gateway 120. The new header 144B also can include a participating gateway ID 148 for each participating gateway (the $party_1$ gateway 124 and the $party_n$ gateway 128 in the illustrated example). The new header 144B also can include a data message transmission ("TX") ID 150 that uniquely identifies the data message 104. The other data segments 106C-106N are left unchanged since the device gateway 120 does not include any of the keys 116C-116N required to decrypt these data segments 106C-106N.

Figure 1D:
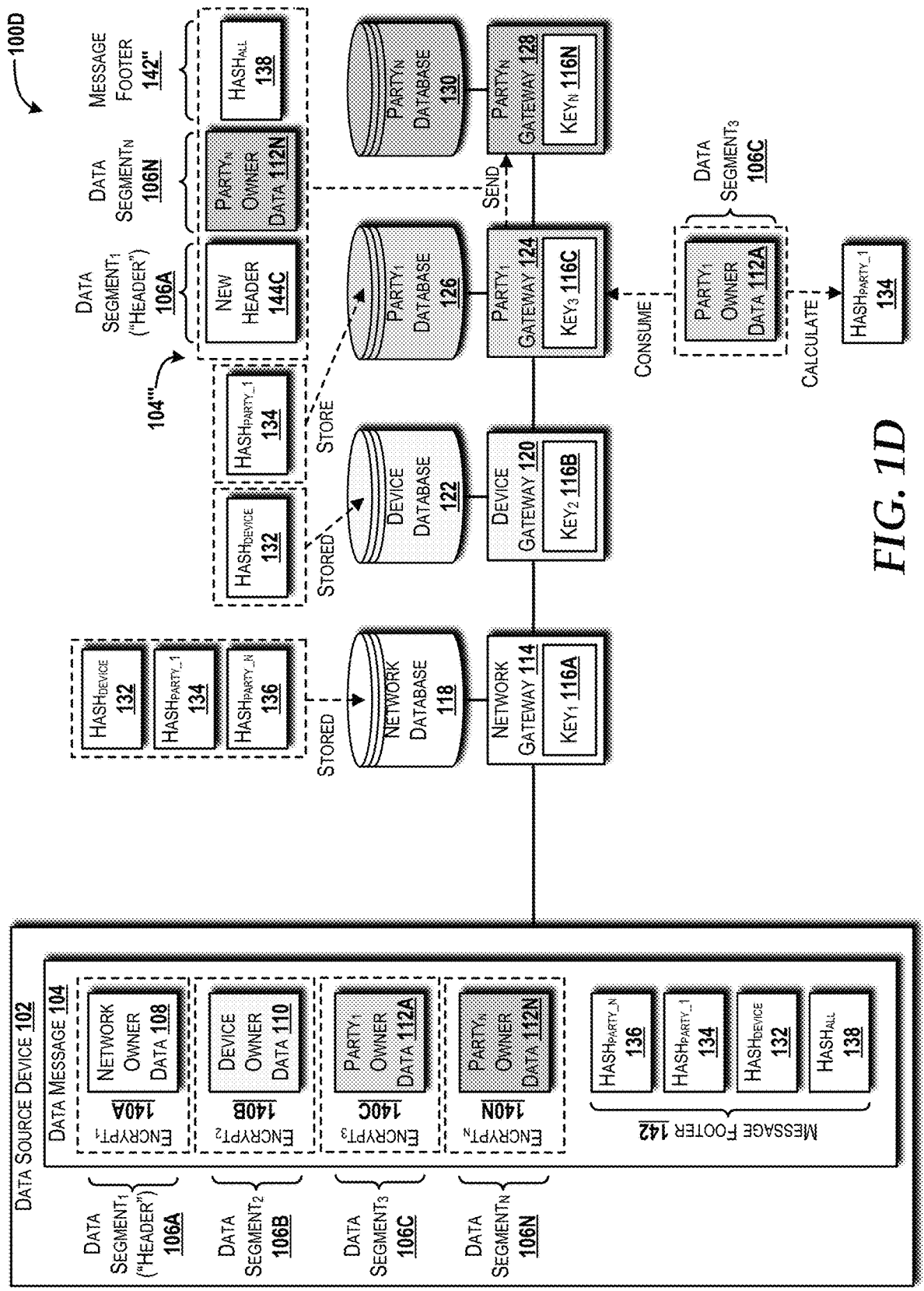

Turning now to FIG. 1D, the operating environment 100D is shown after the device gateway 120 has sent the modified data message 104" to the $party_1$ gateway 124. The $party_1$ gateway 124 can consume and decrypt, using the $key_3$ 116C, the data segments 106C containing the $party_1$ owner data 112A. In this manner, the $party_1$ owner data 112A is removed from the modified data message 104". The $party_1$ gateway 124 also can calculate the $hash_{party\_1}$ 134 from hashing the $party_1$ owner data 112A using the same hash function as the data source device 102. In some embodiments, the hash function to be used can be provided as part of the $data\ segment_1$ 106A. Alternatively, the hash function can be agreed upon by all parties beforehand. The $party_1$ gateway 124 can store the $hash_{party\_1}$ 134 in the $party_1$ database 126. The modified message footer 142' again remains unchanged with only the $hash_{all}$ 138. The $party_1$ gateway 124 can then generate another new header 144C to be included in the $data\ segment_1$ 106A of another modified version of the data message 104 (shown as modified data message 104'''). The new header 144C can include routing data for the next destination in the sequence (i.e., the $party_n$ gateway 128 in the illustrated example). The other data segment 106N is left unchanged since the $party_1$ gateway 124 does not include the key 116N required to decrypt this data segments 106N.

Figure 1E:
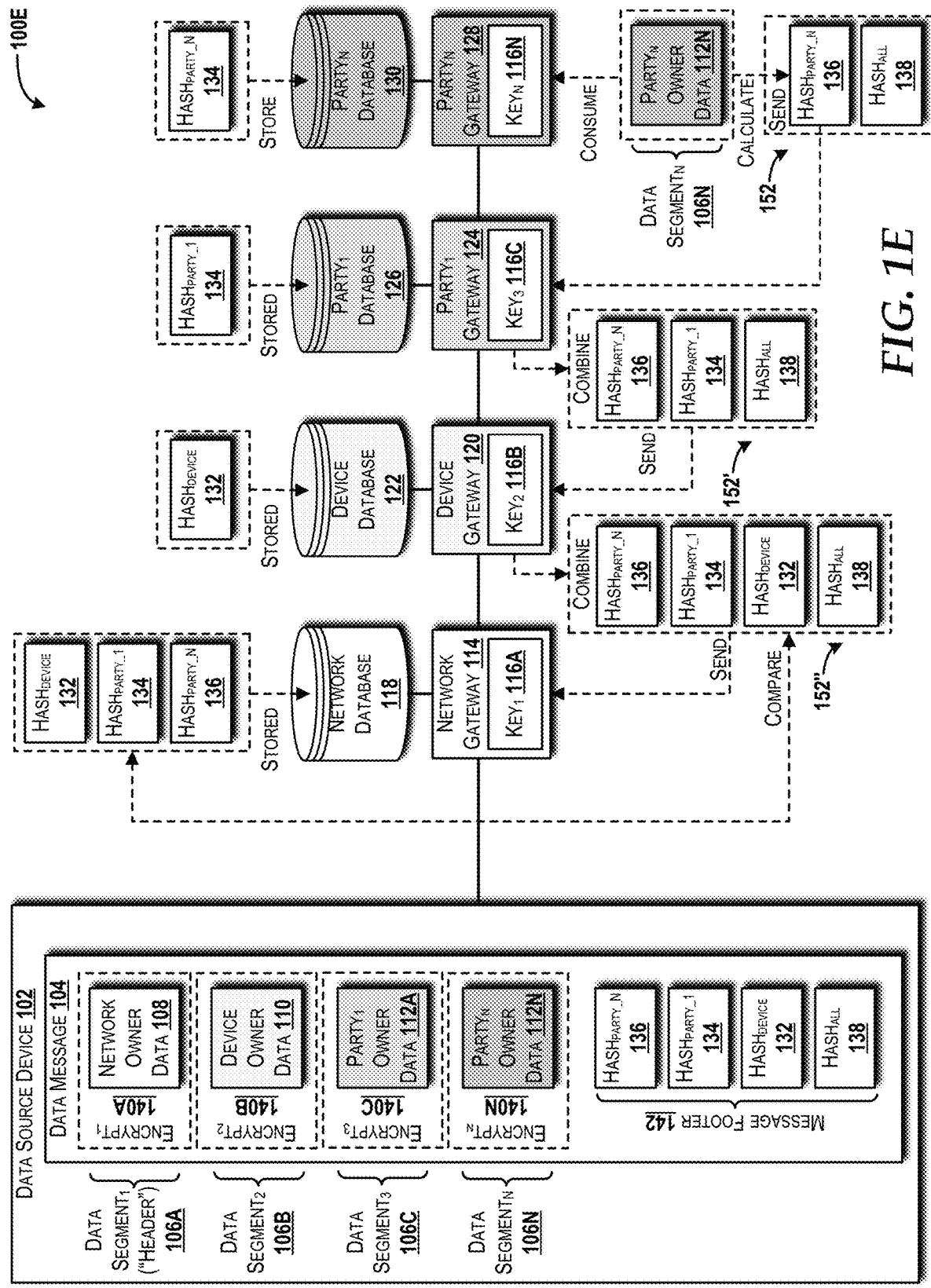

Turning now to FIG. 1E, the operating environment 100E is shown after the $party_1$ gateway 124 has sent the modified data message 104''' to the $party_n$ gateway 128. The $party_n$ gateway 128 can consume and decrypt, using the $key_n$ 116N, the $data\ segment_n$ 106N containing the $party_n$ owner data 112N. In this manner, the $party_n$ owner data 112N is removed from the modified data message 104'''. The $party_n$ gateway 128 also can calculate the $hash_{party\_n}$ 136 from hashing the $party_n$ owner data 112N using the same hash function as the data source device 102. In some embodiments, the hash function to be used can be provided as part of the $data\ segment_1$ 106A. Alternatively, the hash function can be agreed upon by all parties beforehand. The $party_n$ gateway 128 can store the $hash_{party\_n}$ 136 in the $party_n$ database 130.

The $party_n$ gateway 128 can combine the $hash_{party\_n}$ 136 and the $hash_{all}$ 138 in a response message 146, and can send the response message 146 back to the $party_1$ gateway 124. The $party_1$ gateway 124 can combine the $hash_{party\_1}$ 134, the $hash_{party\_n}$ 136, and the $hash_{all}$ 138 in the response message 146' and send the response message 146' back to the device gateway 120. The device gateway 120 can combine the $hash_{party\_1}$ 134, the $hash_{party}$ a 136, the $hash_{device}$ 132, and the $hash_{all}$ 138 in the response message 146" and send the response message 146" back to the network gateway 124. The network gateway 124 can compare the $hash_{party\_1}$ 134, the $hash_{party\_n}$ 136, and the $hash_{device}$ 132 to determine if these values match the values for the $hash_{party}$ 1134, the $hash_{party\_n}$ 136, and the $hash_{device}$ 132 previously stored in the network database 118 when the network gateway 114 first received the data message 104 from the data source device 102. The unhashed values of the $hash_{party\_1}$ 134, the $hash_{party\_n}$ 136, and the $hash_{device}$ 132 can be combined and matched to the unhashed value of the $hash_{all}$ 138 received from the device gateway 120.

Figure 2:
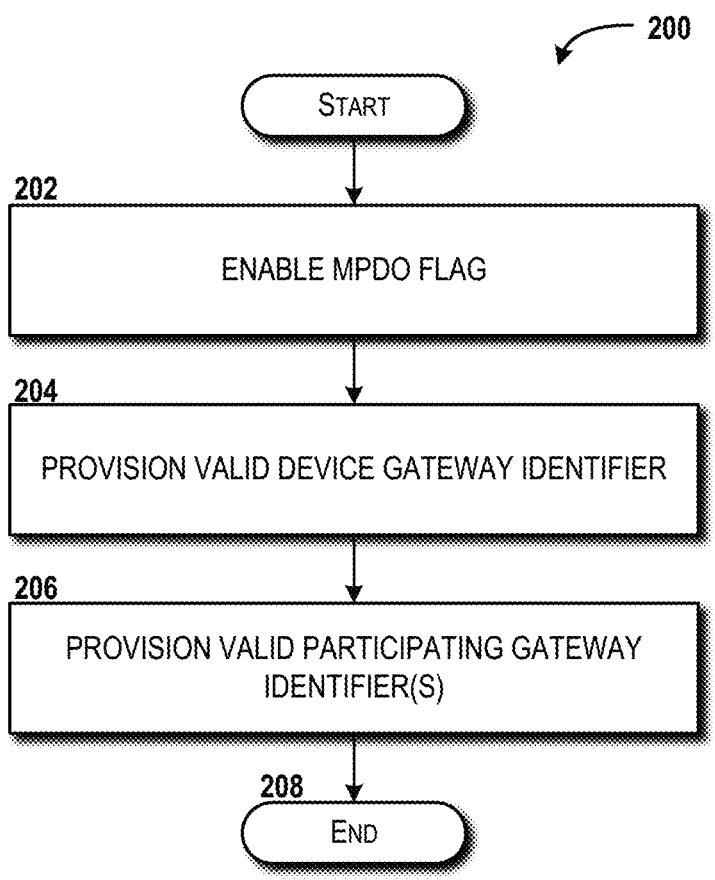
FIG. 2 is a flow diagram illustrating aspects of a method for initial provisioning of a network gateway, according to an illustrative embodiment.

Turning now to FIG. 2, a method 200 for initial provisioning of the network gateway 114 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device to perform one or more operations, and/or causing the processor to direct other components of the computing system or device to perform one or more of the operations.

For purposes of illustrating and describing the concepts of the present disclosure, operations of the methods disclosed herein are described as being performed by the data source device 102, the network gateway 114, the device gateway 120, the party$_1$ gateway 124, and/or the party$_n$ gateway 128. It should be understood that additional and/or alternative devices, servers, computers, and/or network nodes can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the network gateway 114 enables an MPDO flag to indicate that MDPO messages, such as the data message 104, will be consumed by the network gateway 114. From operation 202, the method 200 proceeds to operation 204. At operation 204, the network gateway 114 provisions the device gateway ID 146 for the device gateway 120. From operation 204, the method 200 proceeds to operation 206. At operation 206, the network gateway 114 provisions the participating gateway ID(s) 148 for the valid participating gateways for the specific device gateway provisioned in operation 204, such as the party$_1$ gateway 124 and the party$_n$ gateway 128 in the example shown in FIGS. 1A-1E. From operation 206, the method 200 proceeds to operation 208. At operation 208, the method 200 can end.

Figure 3:
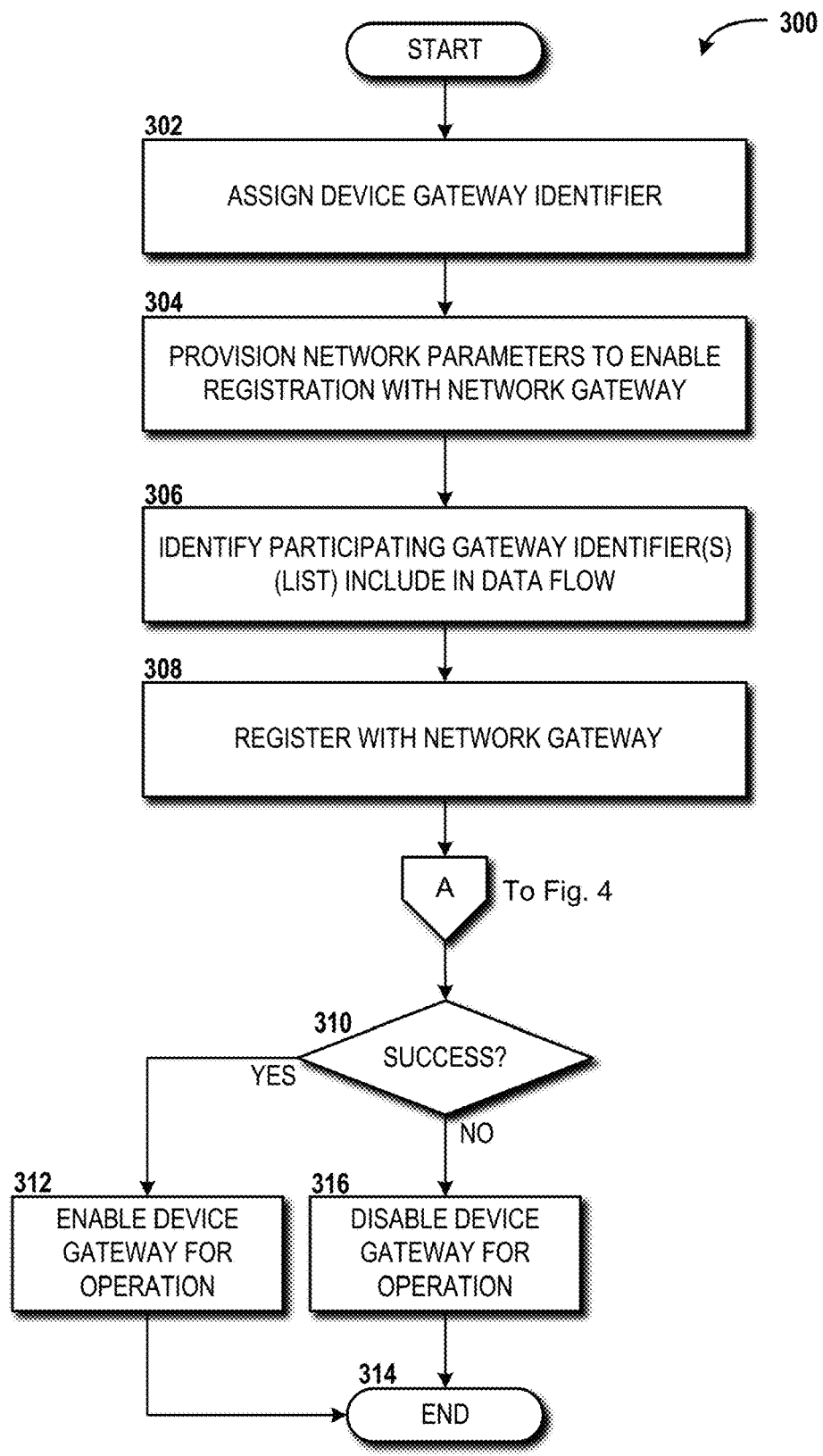
FIG. 3 is a flow diagram illustrating aspects of a method for provisioning a device gateway with a network gateway, according to an illustrative embodiment.

Turning now to FIG. 3, a method 300 for provisioning the device gateway 120 with the network gateway 114, will be described, according to an illustrative embodiment. The method 300 begins and proceeds to operation 302. At operation 302, the device gateway 120 is assigned the device gateway ID 146 to be used to uniquely identify the device gateway 120 to the network gateway 114 and other participating gateway(s). From operation 302, the method 300 proceeds to operation 304. At operation 304, the device gateway 120 is provisioned with network parameters to enable registration with the network gateway 114.

From operation 304, the method 300 proceeds to operation 306. At operation 306, the device gateway 120 is provisioned with a list that includes identifiers for one or more participating gateways, including one or more other device gateways and/or one or more third party gateways (e.g., the party$_1$ gateway 124 and the party$_n$ gateway 128), to be used by the device gateway 120 in a data flow. This list is referred to herein below as the participating gateway ID list. From operation 306, the method 300 proceeds to operation 308. At operation 308, the device gateway 120 registers with the network gateway 114. From operation 308, the method proceed to operation 402 of FIG. 4.

Figure 4:
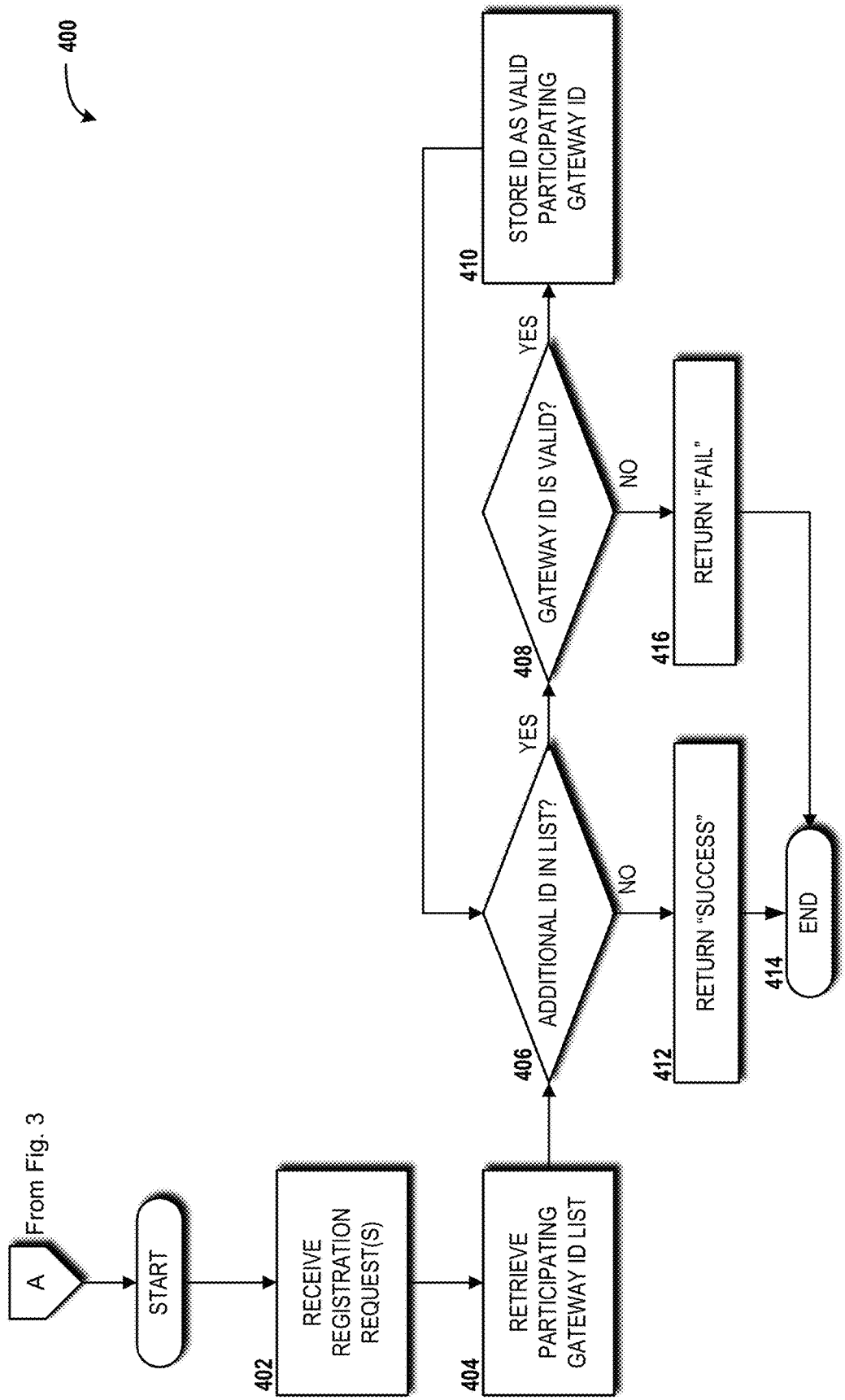
FIG. 4 is a flow diagram illustrating aspects of a method for a network gateway to handle a registration request by a device gateway, according to an illustrative embodiment.

Turning briefly to FIG. 4, a method 400 for the network gateway 114 to handle a registration request by the device gateway 120 will be described, according to an illustrative embodiment. The method 400 begins and proceeds to operation 402. At operation 402, the network gateway 114 receives a registration request from the device gateway 120. The registration request can include the device gateway ID 146 associated with the device gateway 120. From operation 402, the method 400 proceeds to operation 404. At operation 404, the network gateway 114 retrieves the participating gateway ID list (e.g., provisioned at operation 306). From operation 404, the method 400 proceeds to operation 406. At operation 406, the network gateway 114 determines if the device gateway ID 146 is included in the participating gateway ID list. If so, the method 400 proceeds to operation 408. At operation 408, the device gateway 120 determines if the device gateway ID 148 is valid based upon the result of operation 206 (shown in the method 200 of FIG. 2) indicating that the device gateway 120 associated with the device gateway ID 148 is valid. If, at operation 408, the network gateway 114 determines that the device gateway ID 146 is valid, the method 400 proceeds to operation 410. At operation 410, the network gateway 114 stores the device gateway ID 146 as a valid participating gateway ID in the participating gateway ID list. From operation 410, the method 400 returns to operation 406. Operation 406 can repeat for any number of registration requests received from other device gateway(s). When no additional participating gateway IDs 148 are in the participating gateway ID list, the method 400 proceeds to operation 412, where a success response is returned. The method 400 then proceeds to operation 414, where the method 400 can end. Also, if, at operation 408, the network gateway 114 determines that the participating gateway ID 148 is invalid, the method 400 proceeds to operation 416, where a fail response is returned.

Turning back to FIG. 3, and particularly operation 310, the device gateway 120 determines if the success response (operation 412) or the fail response (operation 416) was received from the network gateway 114. If, at operation 310, the device gateway 120 determines that the success response was received, the method 300 proceeds to operation 312. At operation 312, the device gateway 120 is enabled for operation. The method 300 then proceeds to operation 314, where the method 300 can end. Alternatively, if, at operation 310, the device gateway 120 determines that the fail response was received, the method 300 proceeds to operation 316. At operation 316, the device gateway 120 is disabled for operation. The method 300 then proceeds to operation 314, where the method 300 can end.

Figure 5:
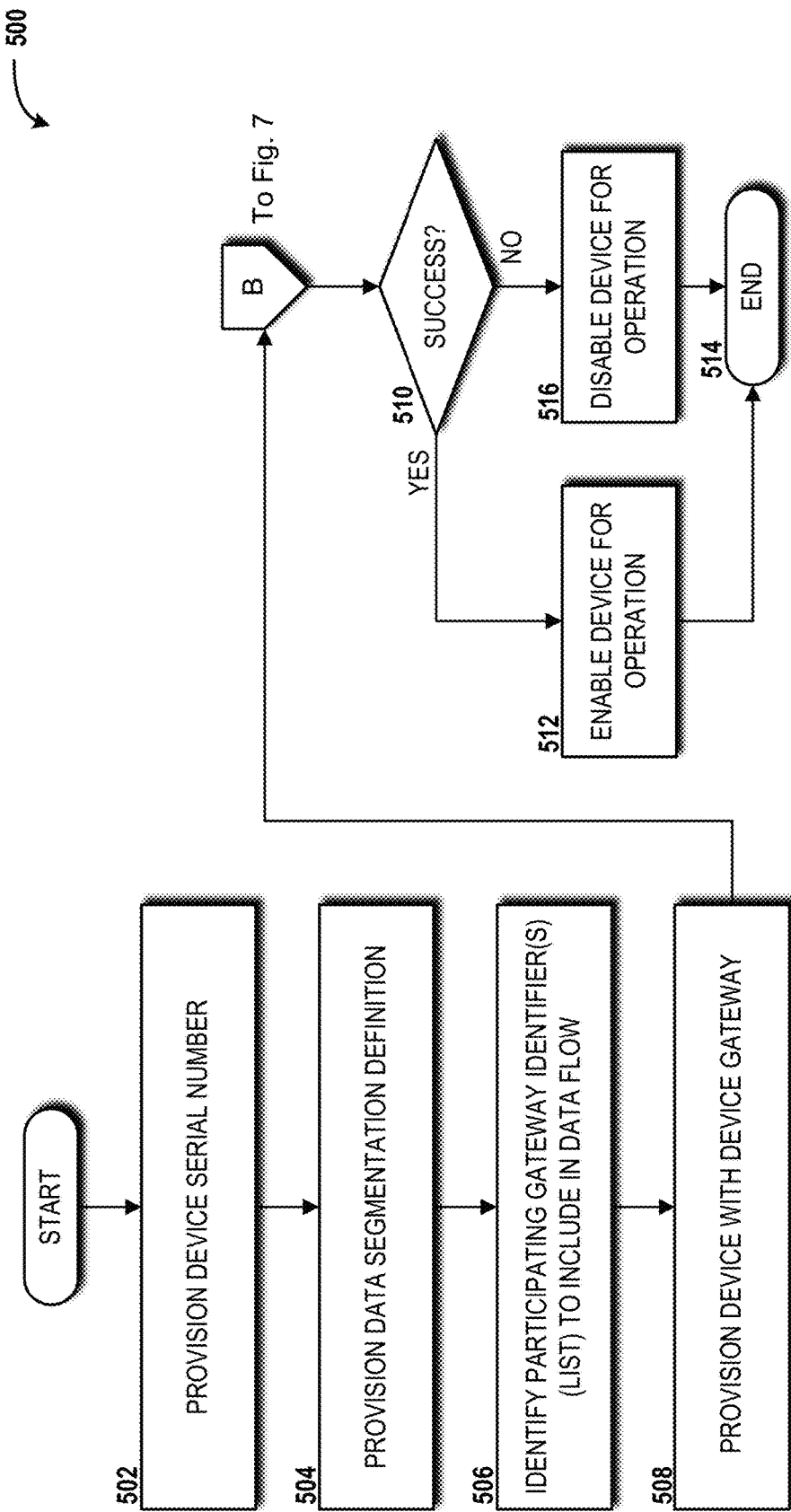
FIG. 5 is a flow diagram illustrating aspects of a method for provisioning a new device to a device gateway, according to an illustrative embodiment.

Turning now to FIG. 5, a method 500 for provisioning a new device, such as the data source device 102, to the device gateway 120 will be described, according to an illustrative embodiment. The method 500 begins and proceeds to operation 502. At operation 502, the device gateway 120 is provisioned with a device serial number (or other identifier) of the new device (e.g., the data source device 102). From operation 502, the method 500 proceeds to operation 504. At operation 504, the device gateway 120 is provisioned with a data segmentation definition that defines what data is owned by each party in a data flow. From operation 504, the method 500 proceeds to operation 506. At operation 506, the device gateway 120 identifies the participating gateway IDs 148 for one or more participating gateways, including one or more other device gateways and/or one or more third party gateways (e.g., the party₁ gateway 124 and the partyₙ gateway 128), to be used by the device gateway 120 in a data flow. From operation 506, the method 500 proceeds to operation 508. At operation 508, the new device is provisioned with the device gateway 120. From operation 508, the method 500 proceeds to FIG. 7, and particularly, operation 702 of the method 700 illustrated in FIG. 7.

Figure 7:
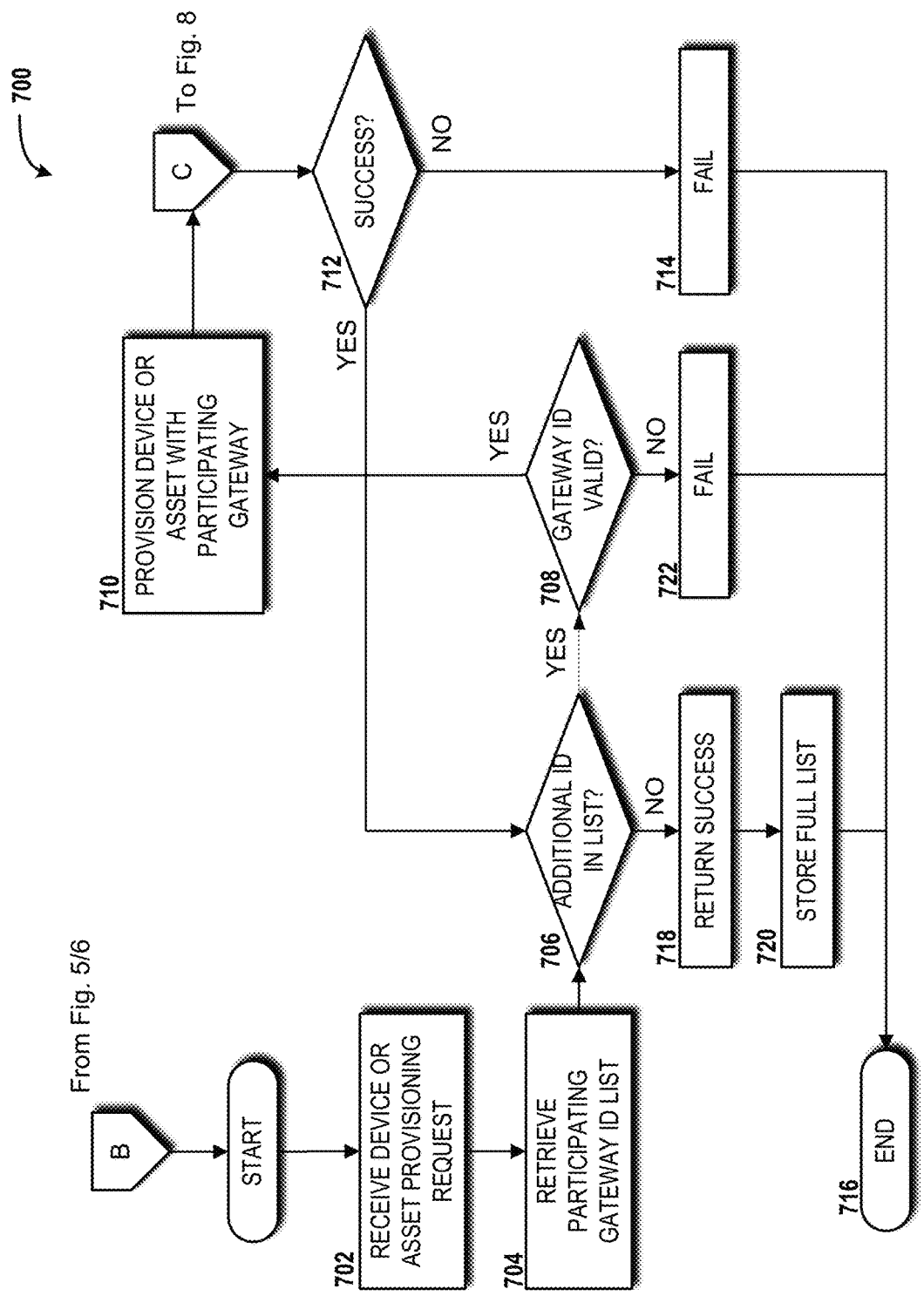
FIG. 7 is a flow diagram illustrating aspects of a method for registering, by a network gateway, a new device, asset, or device+asset with one or more participating (e.g., third party/enterprise) gateways, according to an illustrative embodiment.

Turning briefly to FIG. 7, a method 700 for registering, by the network gateway 114, a new device, a new asset, or a new device+asset with one or more participating (e.g., third party/enterprise) gateways will be described, according to an illustrative embodiment. The method 700 begins and proceeds to operation 702. At operation 702, the network gateway 114 receives, from the device gateway 120, a provisioning request (e.g., for the new device, the new asset, or the new device+asset). From operation 702, the method 700 proceeds to operation 704. At operation 704, the network gateway 114 retrieves the participating gateway ID list. From operation 704, the method 700 proceeds to operation 706. At operation 706, the network gateway 114 determines if the participating gateway ID 148 associated with the participating gateway is included in the participating gateway ID list. If so, the method 700 proceeds to operation 708. At operation 708, the network gateway 114 determines if the participating gateway ID 148 is valid based upon the result of operation 206 (shown in the method 200 of FIG. 2) indicating that participating gateway associated with the participating gateway ID 148 is valid. If, at operation 708, the network gateway 114 determines that the participating gateway ID 148 is valid, the method 700 proceeds to operation 710. At operation 710, the network gateway 114 provisions the device/asset/device+asset with the participating gateway. From operation 710, the method 700 proceeds to FIG. 8, and particularly, operation 802 of the method 800 illustrated in FIG. 8.

Figure 8:
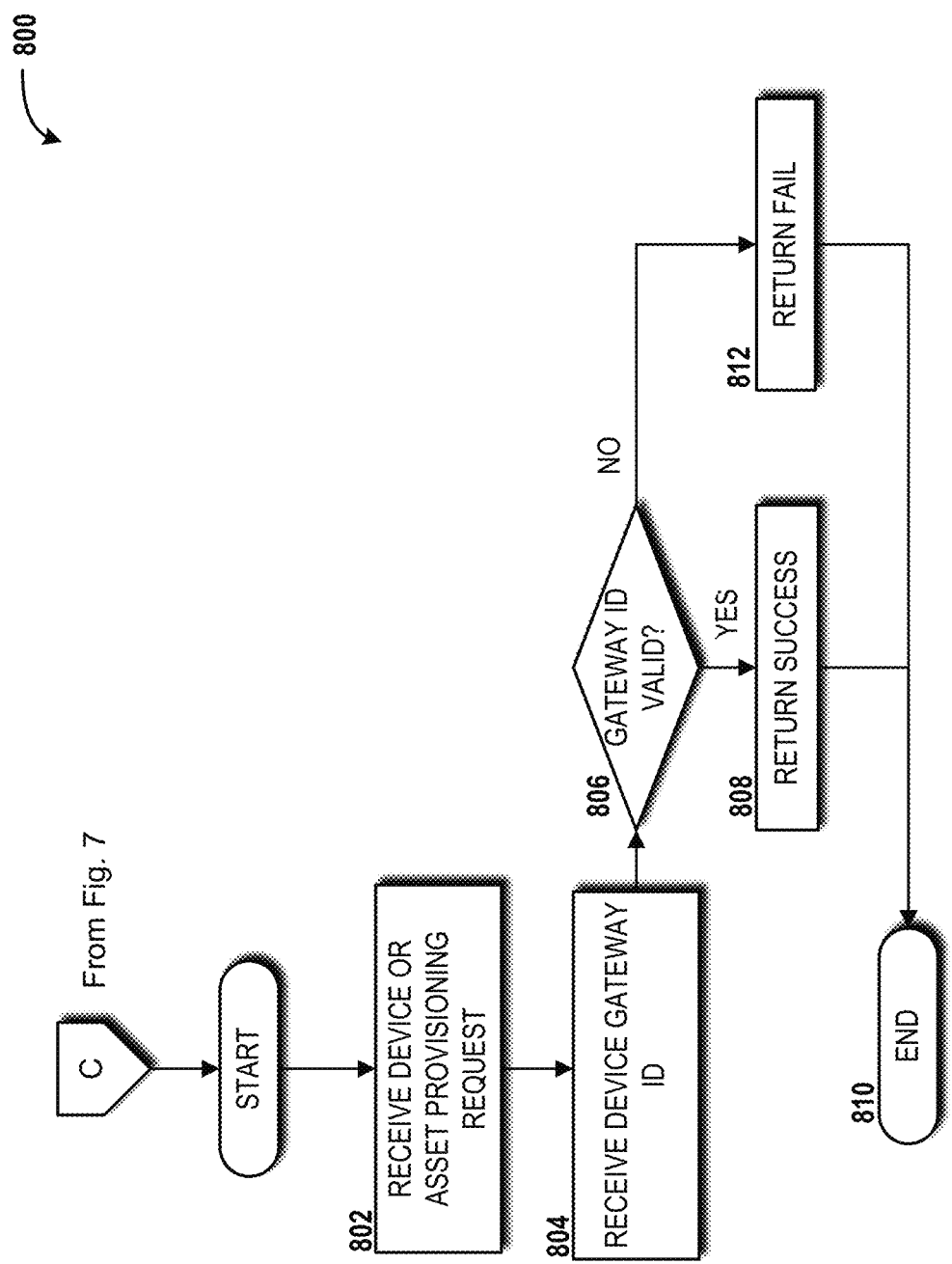
FIG. 8 is a flow diagram illustrating aspects of a method for receiving, by a participating (e.g., third party/enterprise) gateway, a request from a network gateway to provision a device, asset, or device+asset associated with a specific device gateway, according to an illustrative embodiment.

Turning briefly to FIG. 8, a method 800 for receiving, by a participating gateway (e.g., third party/enterprise) gateway, a request for participation will be described, according to an illustrative embodiment. The method 800 begins and proceeds to operation 802. At operation 802, the participating gateway receives a provisioning request from a device, an asset, or a device+asset. From operation 802, the method 800 proceeds to operation 804. At operation 804, the participating gateway receives the device gateway ID 146 that uniquely identifies the device gateway 120. From operation 804, the method 800 proceeds to operation 806. At operation 806, the participating gateway determines if the device gateway ID 146 is valid based upon the result of operation 206 (shown in the method 200 of FIG. 2) indicating that the device gateway 120 associated with the device gateway ID 148 is valid. If, at operation 806, the participating gateway determines that the device gateway ID 146 is valid, the method 800 proceeds to operation 808, where a success response is returned. The method 800 then proceeds to operation 810, where the method 800 can end. If, however, at operation 806, the participating gateway determines that the device gateway ID 146 is invalid, the method 800 proceeds to operation 812, where a fail response is returned. The method 800 then proceeds to operation 810, where the method 800 can end.

Turning back to FIG. 7, and particularly operation 712, the network gateway 114 determines if the success response (operation 808) or the fail response (operation 812) was received. If, at operation 712, the network gateway 114 determines that the success response was received, the method 700 returns to operation 706. Alternatively, if, at operation 712, the network gateway 114 determines that the fail response was received, the method 700 proceeds to operation 714, where a fail response is returned to the method 500 or the method 600 as the case may be. From operation 714, the method 700 proceeds to operation 716. At operation 716, the method 700 can end.

Operation 706 can repeat for any number of registration requests received from participating gateway(s). When no additional participating gateway IDs 148 are in the participating gateway ID list, the method 700 proceeds to operation 718, where a success response is returned. The method 700 then proceeds to operation 720, where the network gateway 114 stores the full participating gateway ID list. From operation 720, the method 700 can proceed to operation 716. The method 700 can end at operation 716.

Turning now back to FIG. 5, and particularly operation 510, the device gateway 120 determines if the success response (operation 718) or the fail response (operation 714 or operation 722) was received. If, at operation 510, the success response was received, the method 500 proceeds to operation 512. At operation 512, the device is enabled for operation. The method 500 then proceeds to operation 514, where the method 500 can end. Alternatively, if, at operation 510, the fail response is received, the method 500 proceeds to operation 516. At operation 516, the device is disabled for operation. The method 500 then proceeds to operation 514, where the method 500 can end.

Figure 6:
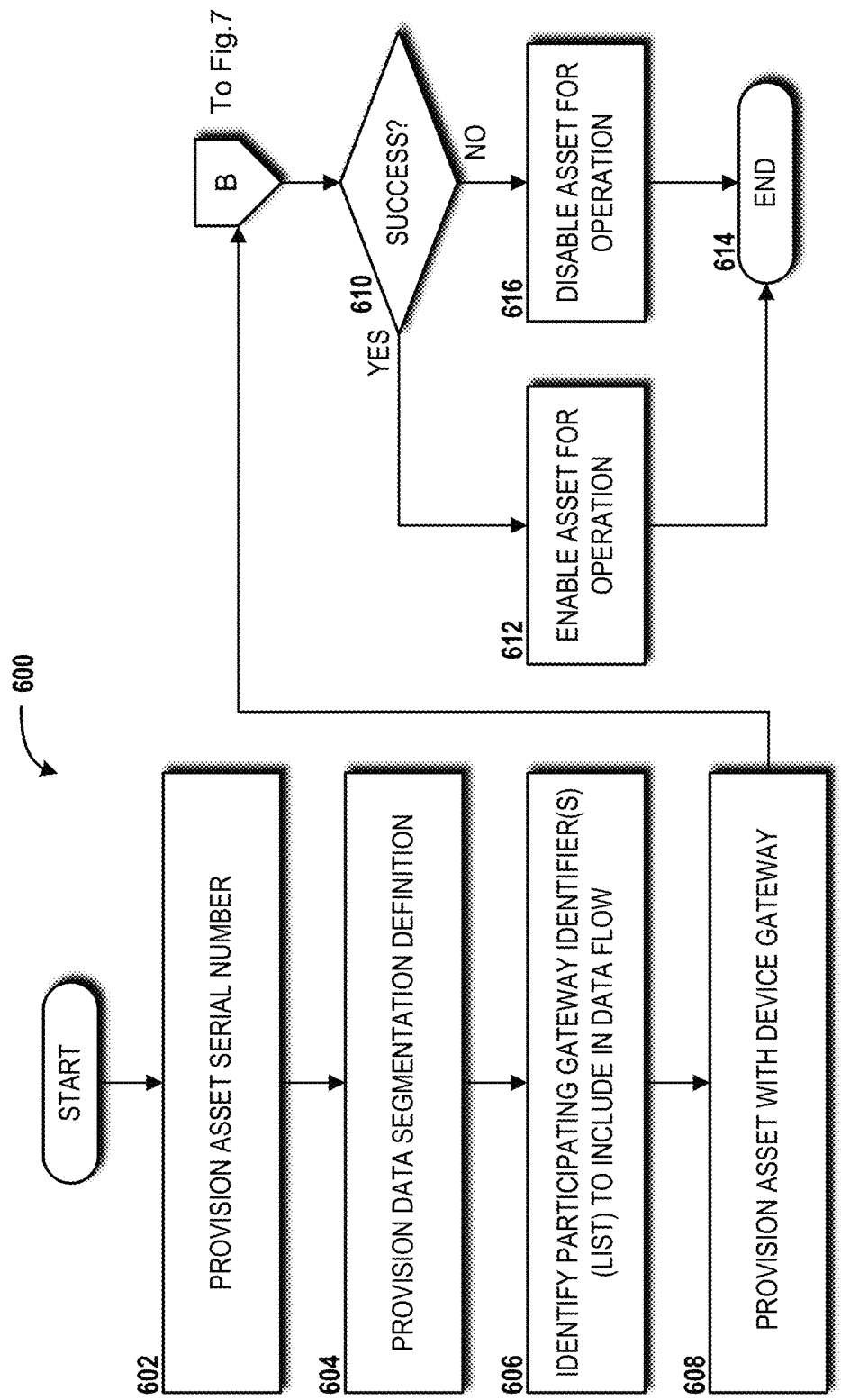
FIG. 6 is a flow diagram illustrating aspects of a method for provisioning a new asset to a device gateway, according to an illustrative embodiment.

Turning now to FIG. 6, a method for provisioning a new asset (e.g., the asset 1502 best shown in FIG. 15) to the device gateway 120 will be described, according to an illustrative embodiment. The method 600 begins and proceeds to operation 602. At operation 602, the device gateway 120 is provisioned with an asset serial number (or other identifier) of the asset 1502. From operation 602, the method 600 proceeds to operation 604. At operation 604, the device gateway 120 is provisioned with a data segmentation definition that defines what data is owned by each party in a data flow. From operation 604, the method 600 proceeds to operation 606. At operation 606, the device gateway 120 identifies the participating gateway IDs 148 for one or more participating gateways, including one or more other device gateways and/or one or more third party gateways (e.g., the party₁ gateway 124 and the partyₙ gateway 128), to be used by the device gateway 120 in a data flow. From operation 606, the method 600 proceeds to operation 608. At operation 608, the new asset is provisioned with the network gateway 114. From operation 608, the method 600 proceeds to FIG. 7, and particularly, operation 702 of the method 700, which is described above.

From FIG. 7, the method 600 proceeds to operation 610, the device gateway 120 determines if the success response (operation 718) or the fail response (operation 714 or operation 722) was received. If, at operation 610, the success response was received, the method 600 proceeds to operation 612. At operation 612, the asset is enabled for operation. The method 600 then proceeds to operation 614, where the method 600 can end. Alternatively, if, at operation 610, the fail response is received, the method 600 proceeds to operation 616. At operation 616, the asset is disabled for operation. The method 600 then proceeds to operation 614, where the method 600 can end.

Figure 9:
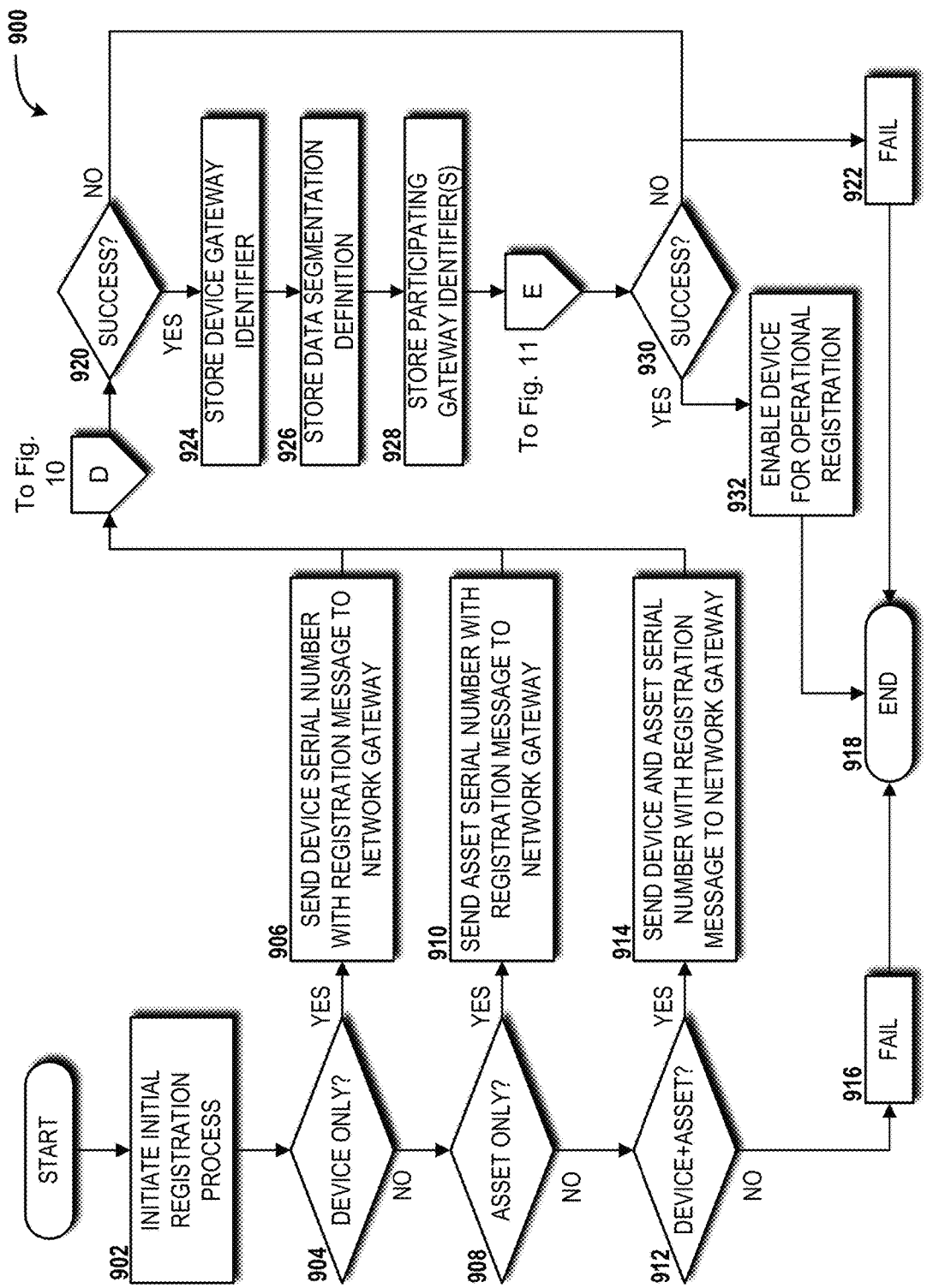
FIG. 9 is a flow diagram illustrating aspects of a method for registering, by a network gateway, a new device, asset, or device+asset for operation, according to an illustrative embodiment.

Turning now to FIG. 9, a method 900 for registering a new device, asset, or device+asset for operation will be described, according to an illustrative embodiment. The method 900 will be described from the perspective of the data source device 102. The method 900 begins and proceeds to operation 902. At operation 902, the data source device 102 initiates an initial registration process. From operation 902, the method 900 proceeds to operation 904, where it is determined if the registration process is for a device only. If so, the method 900 proceeds to operation 906. At operation 906, the data source device 102 sends the device serial number (or other identifier) with a registration message to the network gateway 114. From operation 906, the method 900 proceeds to FIG. 10, and particularly operation 1002.

Returning to operation 904, if it is determined that the registration process is not for a device only, the method 900 proceeds to operation 908. At operation 908, it is determined if the registration process is for an asset only. If so, the method 900 proceeds to operation 910. At operation 910, the data source device 102 sends the asset serial number (or other identifier) with a registration message to the network gateway 114. From operation 910, the method 900 proceeds to FIG. 10, and particularly operation 1002.

Returning to operation 908, if it is determined that the registration process is not for an asset only, the method 900 proceeds to operation 912. At operation 912, it is determined if the registration process is for a device and asset combination (device+asset). If so, the method 900 proceeds to operation 914. At operation 914, the data source device 102 sends the device+asset serial number (or other identifier) with a registration message to the network gateway 114. From operation 914, the method 900 proceeds to FIG. 10, and particularly operation 1002. If, however, at operation 912, it is determined that the registration process also is not for the device+asset combination, the method 900 proceeds to operation 916. At operation 916, the registration process fails. From operation 916, the method 900 proceeds to operation 918. The method 900 can end at operation 918.

Figure 10:
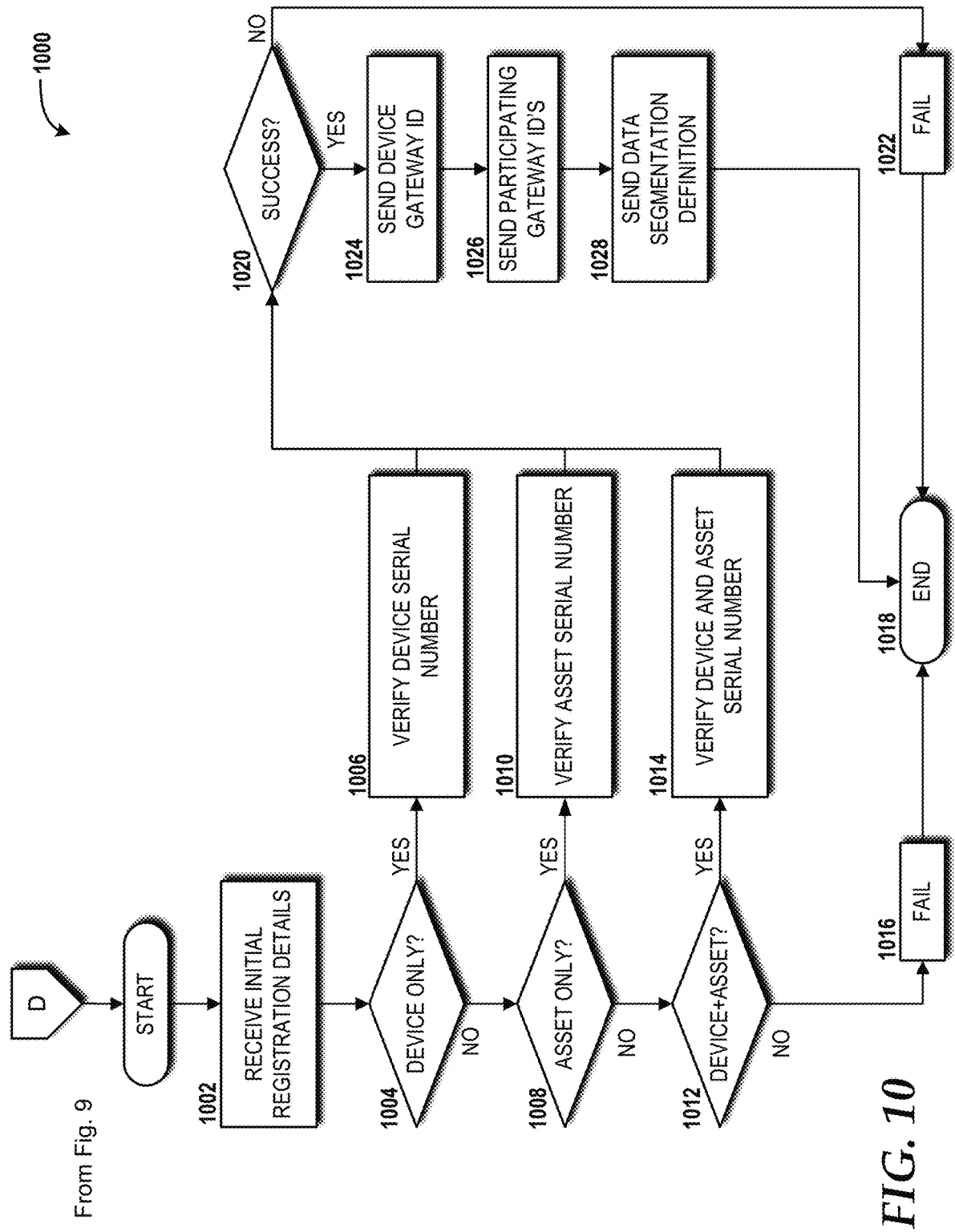
FIG. 10 is a flow diagram for registering, by a network gateway, a new device, asset, or device+asset for operation, according to an illustrative embodiment.

After operation 906, 910, or 914, the method 900 proceeds to FIG. 10, and particularly, operation 1002. Turning briefly to FIG. 10, a method 1000 for registering, by the network gateway 114, a new device/asset for operation will be described, according to an illustrative embodiment. The method 1000 begins and proceeds to operation 1002. At operation 1002, the network gateway 114 receives initial registration details. From operation 1002, the method 1000 proceeds to operation 1004, where it is determined if the registration details are for a device only. If so, the method 1000 proceeds to operation 1006. At operation 1006, the network gateway 114 verifies the device serial number (or other identifier). If not, the method 1000 proceeds to operation 1008, where it is determined if the registration details are for an asset only. If so, the method 1000 proceeds to operation 1010. At operation 1010, the network gateway 114 verifies the asset serial number (or other identifier). If not, the method 1000 proceeds to operation 1012, where it is determined if the registration details are for a device and asset combination. If so, the method 1000 proceeds to operation 1014. At operation 1014, the network gateway 114 verifies the device+asset serial number (or other identifier). If not, the method 1000 proceeds to operation 1016, where method 1000 fails and proceeds to operation 1018. The method 1000 can end at operation 1018.

After operation 1006, 1010, or 1014, the method 1000 proceeds to operation 1020. At operation 1020, it is determined if the verification at any of these operations was successful. If not, the method 1000 proceeds to operation 1022, where the method 100 fails and proceeds to operation 1018. The method 1000 can end at operation 1018. If, however, at operation 1020, it is determined that the verification of any of these operations was successful, the method 1000 proceeds to operation 1024. At operation 1024, the network gateway 114 sends the device gateway ID 146 to the device/asset/device+asset as the case may be. From operation 1024, the method 1000 proceeds to operation 1026. At operation 1026, the network gateway 114 sends the participating gateway IDs 148 to the device/asset/device+asset as the case may be. From operation 1026, the method 1000 proceeds to operation 1028. At operation 1028, the network gateway 114 sends the data segmentation definition to the device/asset/device+asset as the case may be. From operation 1028, the method 1000 proceeds to operation 1018. The method 1000 can end at operation 1018.

Returning to FIG. 9, and particularly operation 920, the device/asset/device+asset determines if the output of the method 1000 was successful. If not, the method 900 proceeds to operation 922, where the method 900 fails. The method 900 then proceeds to operation 918. The method 900 can end at operation 918. If, however, at operation 920, the device/asset/device+asset determines that the output of the method 1000 was successful, the method 900 proceeds to operation 924. At operation 924, the device/asset/device+asset stores the device gateway ID 146. From operation 924, the method 900 proceeds to operation 926. At operation 926, the device/asset/device+asset stores the data segmentation definition. From operation 926, the method 900 proceeds to operation 928. At operation 928, the device/asset/device+asset stores the participating gateway IDs 148. From operation 928, the method 900 proceeds to FIG. 11, and particularly, operation 1102.

Figure 11:
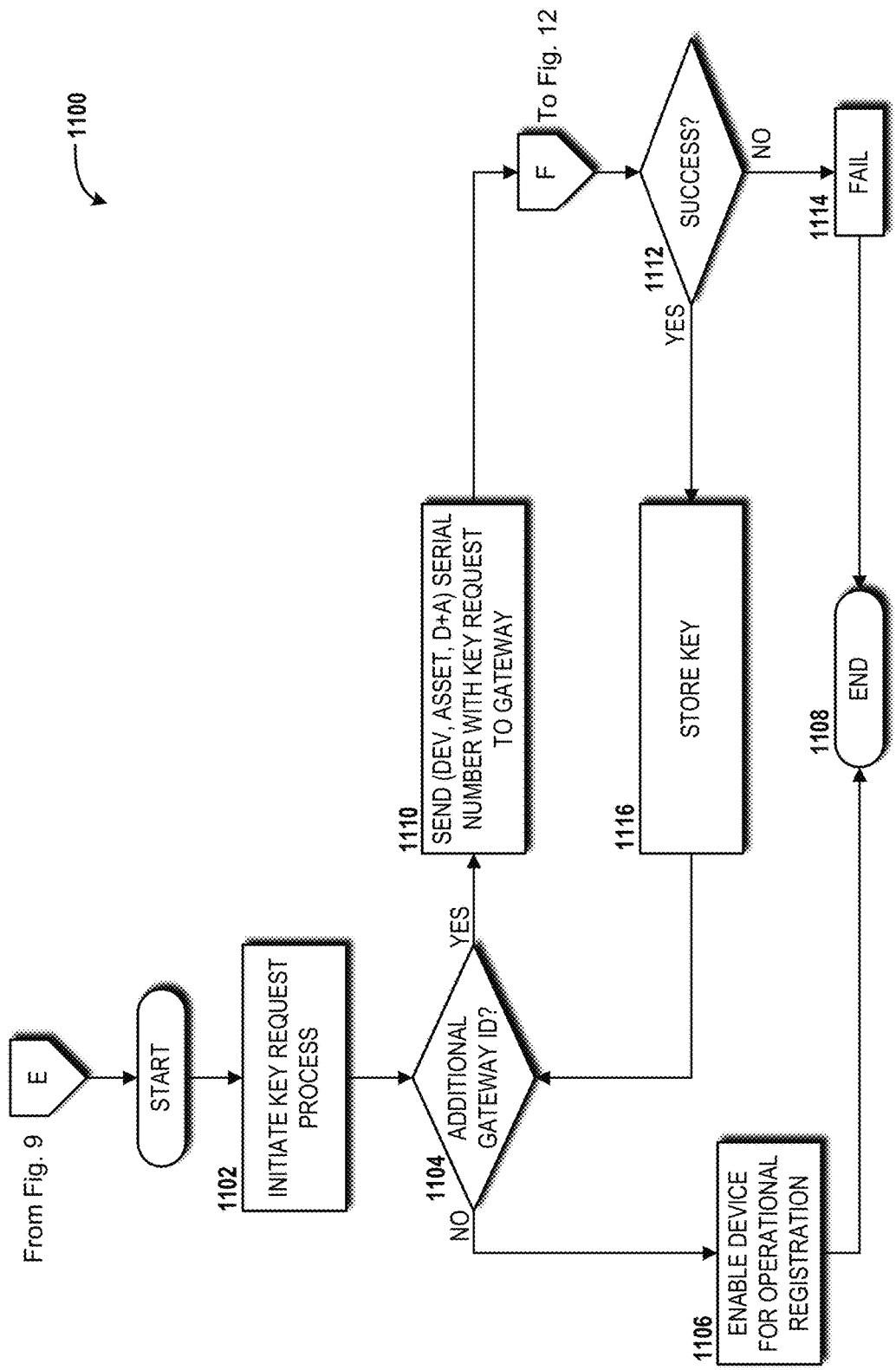
FIG. 11 is a flow diagram illustrating aspects of a method for obtaining, by a device, asset, or device+asset keys from a device gateway and participating (e.g., third party/enterprise) gateway(s), according to an illustrative embodiment.

Turning briefly to FIG. 11, a method 1100 for obtaining, by a device/asset/device+asset, key(s) from the device gateway 120 and one or more participating gateway(s) (e.g., the party$_1$ gateway 124 and/or the party$_n$ gateway 128) will be described, according to an illustrative embodiment. The method 1100 begins and proceeds to operation 1102. At operation 1102, the device/asset/device+asset initiates a key request process. From operation 1102, the method proceeds to operation 1104. At operation 1104, the device/asset/device+asset determines if an additional gateway ID is available for which a key has not been obtained. If not, the method 1100 proceeds to operation 1106. At operation 1106, the device/asset/device+asset is enabled for operational registration. The method 1100 then proceeds to operation 1108. The method 1100 can end at operation 1108. If, however, at operation 1104, the device/asset/device+asset determines that an additional gateway ID is available for which a key has not been obtained, the method 1100 proceeds to operation 1110. At operation 1110, the device/asset/device+asset sends the appropriate serial number (or other identifier) with a key request to the gateway associated with the additional gateway ID. From operation 1110, the method 1100 proceeds to FIG. 12, and particularly operation 1202.

Figure 12:
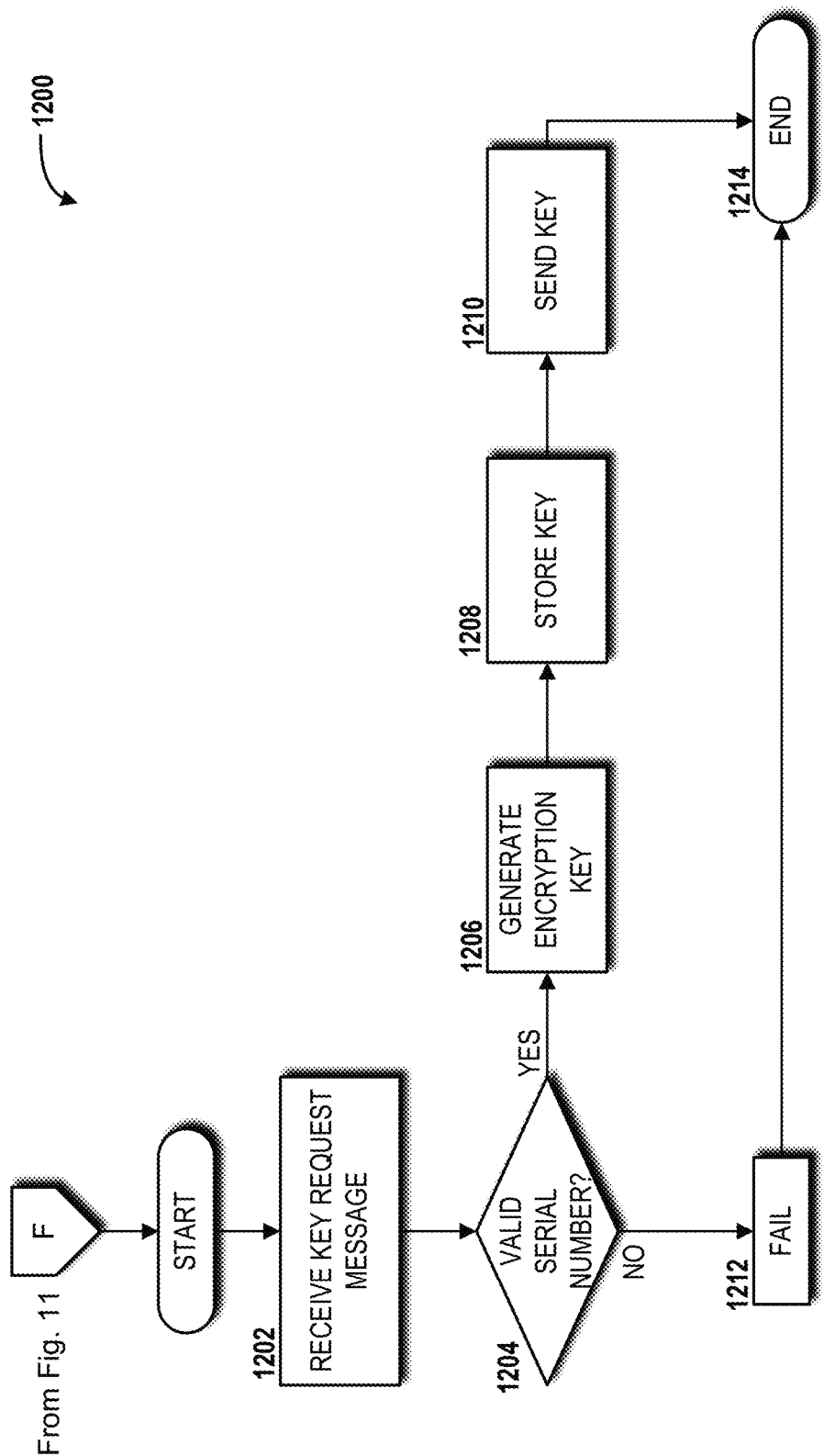
FIG. 12 is a flow diagram illustrating aspects of a method for receiving, by a device gateway and/or one or more participating gateways, a request for a key, according to an illustrative embodiment.

Turning briefly to FIG. 12, a method 1200 for receiving, by the device gateway 120 and/or one or more participating gateway(s) (e.g., the party$_1$ gateway 124 and/or the party$_n$ gateway 128), a key request will be described, according to an illustrative embodiment. The method 1200 begins and proceeds to operation 1202, where the device/asset/device+ asset or the participating gateway receives a key request message. From operation 1202, the method 1200 proceeds to operation 1204, where the device gateway 120 and/or one or more participating gateways determine(s) if the key request is from a source that has a valid serial number (or other identifier). If not, the method 1200 proceeds to operation 1212, where the method 1200 fails. The method 1200 then proceeds to operation 1214, where the method 1200 can end. If, however, at operation 1204, the device gateway 120 and/or one or more participating gateways determine(s) that the key request is from a source that has a valid serial number (or other identifier), the method 1200 proceeds to operation 1206. At operation 1206, the device gateway 120 and/or one or more participating gateways generate(s) an encryption key (e.g., one or more of the keys 116A-116N). From operation 1206, the method 1200 proceeds to operation 1208, where the device gateway 120 and/or one or more participating gateways store(s) the key. From operation 1208, the method 1200 proceeds to operation 1210, where the device gateway 120 and/or one or more participating gateways send(s) the key back to the requester (e.g., the device gateway 120 and/or one or more participating gateways as the case may be). From operation 1210, the method 1200 proceeds to operation 1214. The method 1200 can end at operation 1214.

Returning to FIG. 11, and particularly operation 1112, the device/asset/device+asset determines if the method 1200 was successful. If not, the method 1100 proceeds to operation 1114, where the method 1100 fails. The method 1100 can then proceed to operation 1108. The method 1100 can end at operation 1108. If, however, at operation 1112, the device/asset/device+asset determines that the method 1200 was successful (i.e., the device/asset/device+asset received a key), the method 1100 proceeds to operation 1116. At operation 1116, the device/asset/device+asset stores the key for later use. The method 1100 can then proceed back to the operation 1104, and the method 1100 can proceed as described above.

Figure 13:
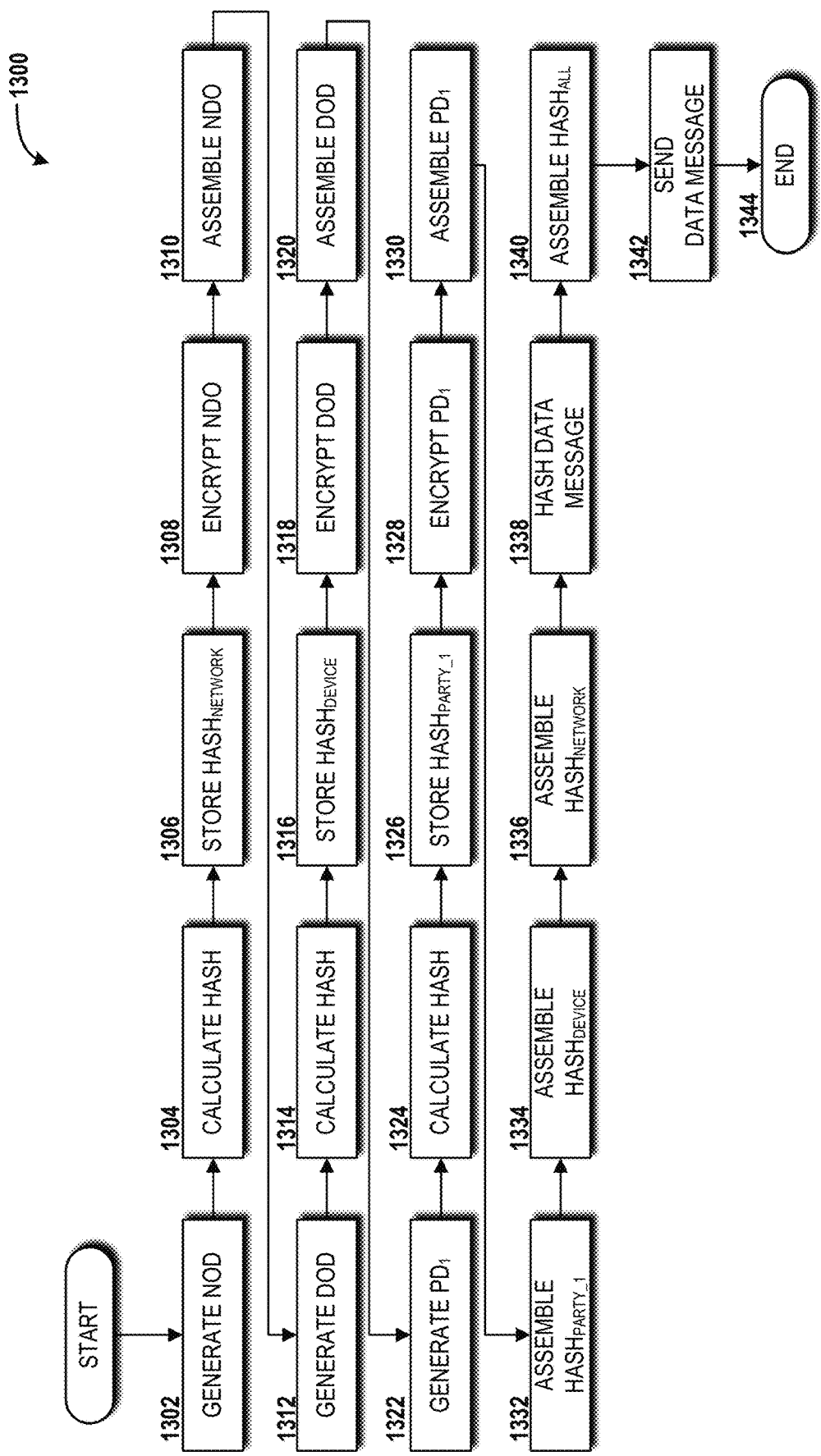
FIG. 13 is a flow diagram illustrating aspects of a method for generating, by a data source, a multi-party data ownership ("MPDO") data message, according to an illustrative embodiment.

Turning now to FIG. 13, a flow diagram illustrating a method 1300 for generating, by the data source device 102, the data message 104 will be described, according to an illustrative embodiment. The method 1300 will be described with additional reference to FIG. 1A.

The method 1300 begins and proceeds to operation 1302. At operation 1302, the data source device 102 generates the network owner data 108 ("NOD" in the flow diagram). From operation 1302, the method 1300 proceeds to operation 1304. At operation 1304, the data source device 102 calculates a hash of the network owner data 108 ("hash$_{network}$"; not explicitly shown in FIG. 1A). From operation 1304, the method 1300 proceeds to operation 1306. At operation 1306, the data source device 102 stores the hash$_{network}$. From operation 1306, the method 1300 proceeds to operation 1308. At operation 1308, the data source device 102 encrypts the network owner data 108 (e.g., using the first encryption 140A). From operation 1308, the method 1300 proceeds to operation 1310. At operation 1310, the data source device 102 assembles the network owner data 108.

From operation 1310, the method 1300 proceeds to operation 1312. At operation 1312, the data source device 102 generates the device owner data 110 ("DOD" in the flow diagram). From operation 1312, the method 1300 proceeds to operation 1314. At operation 1314, the data source device 102 calculates a hash of the device owner data 110 ("hash$_{device}$ 132"). From operation 1314, the method 1300 proceeds to operation 1316. At operation 1316, the data source device 102 stores the hash$_{device}$ 132. From operation 1316, the method 1300 proceeds to operation 1318. At operation 1318, the data source device 102 encrypts the device owner data 110 (e.g., using the second encryption 140B). From operation 1318, the method 1300 proceeds to operation 1320. At operation 1320, the data source device 102 assembles the device owner data 110.

From operation 1320, the method 1300 proceeds to operation 1322. At operation 1322, the data source device 102 generates the party$_1$ owner data 112A ("PDC$_1$" in the flow diagram). From operation 1322, the method 1300 proceeds to operation 1324. At operation 1324, the data source device 102 calculates a hash of the party$_1$ owner data 112A ("hash$_{party\_1}$ 134"). From operation 1324, the method 1300 proceeds to operation 1326. At operation 1326, the data source device 102 stores the hash$_{party\_1}$ 134. From operation 1326, the method 1300 proceeds to operation 1328. At operation 1328, the data source device 102 encrypts the party$_1$ owner data 112A (e.g., using the third encryption 140C). From operation 1328, the method 1300 proceeds to operation 1330. At operation 1330, the data source device 102 assembles the party$_1$ owner data 112A. The operations 1322-1330 can be repeated for the party$_n$ owner data 112N.

From operation 1330, the method 1300 proceeds to operation 1332. At operation 1332, the data source device 102 assembles the hash$_{party}$ 1134. From operation 1332, the method 1300 proceeds to operation 1334. At operation 1334, the data source device 102 assembles the hash$_{device}$ 132. From operation 1334, the method 1300 proceeds to operation 1336. At operation 1336, the data source device 102 assembles the hash$_{network}$. From operation 1336, the method 1300 proceeds to operation 1338. At operation 1338, the data source device 102 hashes the data message 104 to create the hash$_{all}$ 138 of all data segments 106A-106N, including hashes of the network owner data 108, the device owner data 110, and the party$_1$ owner data 112A (in the illustrated example). From operation 1338, the method 1300 proceeds to operation 1340. At operation 1340, the data source device 102 assembles the hash$_{all}$ 138. At this point the data message 104 is completely assembled and ready to be sent, for example, to the network gateway 114 as shown in the embodiment illustrated in FIG. 1A. From operation 1340, the method 1300 proceeds to operation 1342. At operation 1342, the data source device 102 sends the data message 104 to the network gateway 114. From operation 1342, the method 1300 proceeds to operation 1344. The method 1300 can end at operation 1344.

Figure 14:
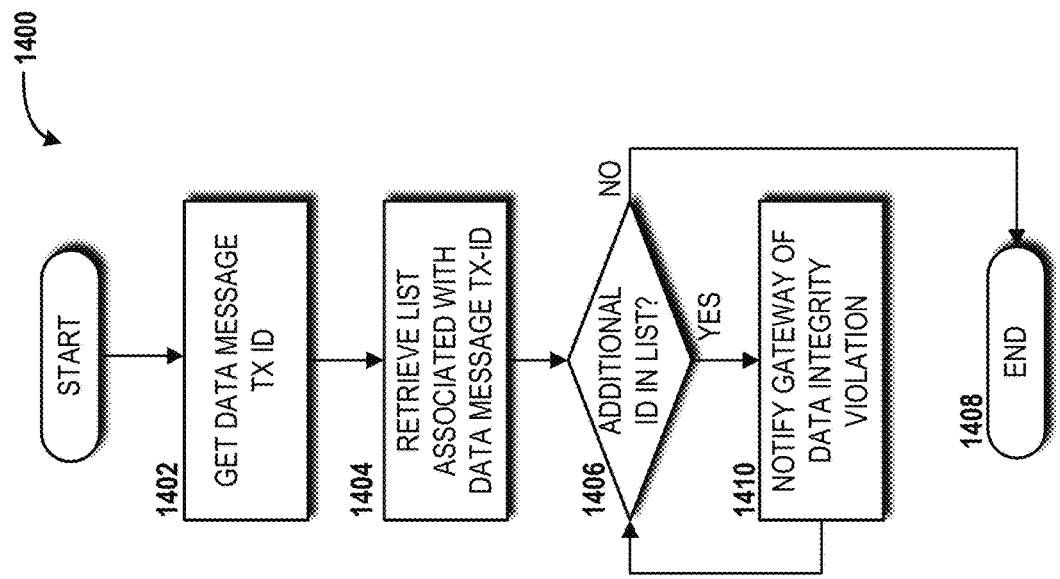
FIG. 14 is a flow diagram illustrating aspects of a method for notifying one or more participating gateways and/or a device, asset, or device+asset of a data integrity violation, according to an illustrative embodiment.

Turning now to FIG. 14, a method 1400 for notifying one or more participating gateways and/or a device/asset, or device+asset of a data integrity violation will be described, according to an illustrative embodiment. The method 1400 begins and proceeds to operation 1402. At operation 1402, the participating gateway gets the data message TX ID 150 for the data message 104. From operation 1402, the method 1400 proceeds to operation 1404. At operation 1404, the participating gateway retrieves a list associated with the data message TX ID 150. From operation 1404, the method 1400 proceeds to operation 1406. At operation 1406, the participating gateway determines if any additional gateway ID(s) beyond those associated with the data message TX ID 150 is/are in the list. If not, the method 1400 proceeds to operation 1408. At operation 1408, the method 1400 can end. If, however, at operation 1406, the participating gateway determines that an additional gateway ID is in the list, the method 1400 proceeds to operation 1410, where the participating gateway notifies the other participating gateways of a data integrity violation. This loop continues until no additional participating gateway IDs are found. When no additional participating gateway IDs are found, the method 1400 can proceed to operation 1408. The method 1400 can then end at operation 1408.

Figure 15:
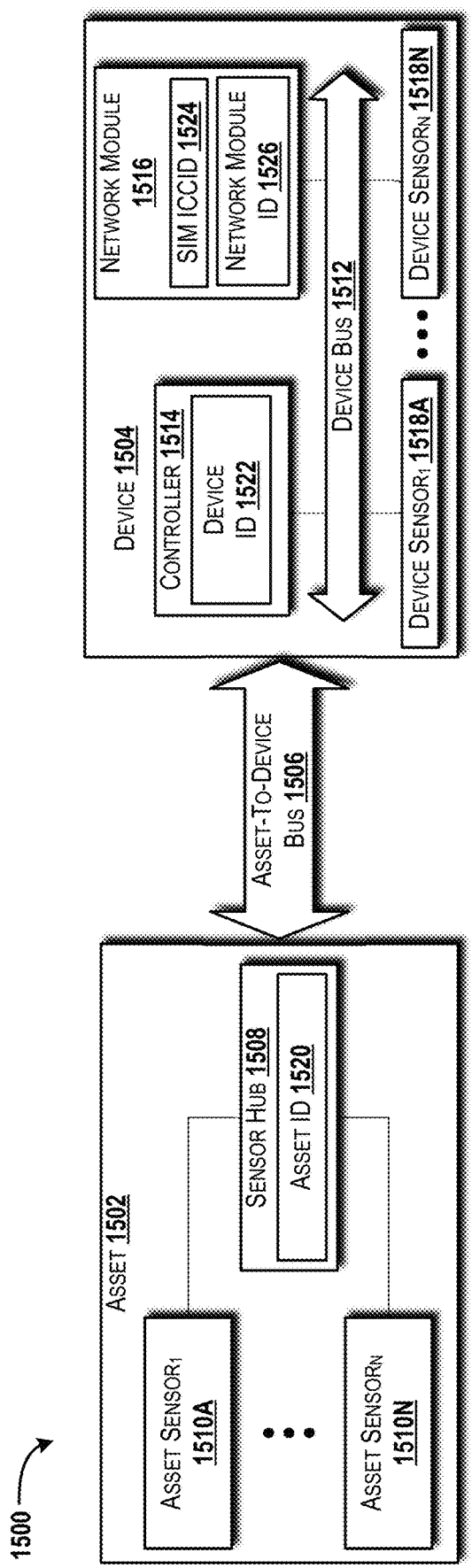
FIG. 15 is a block diagram illustrating aspects of an exemplary data source device implemented as a device, an asset, or a combination thereof, according to an illustrative embodiment.

Turning now to FIG. 15, a combination data source device 1500 that combines an asset 1502 and a device 1504 will be described, according to an illustrative embodiment. The asset 1502 can be any "thing" that is to be tracked and/or monitored. The asset 1502 is flexible and can support n-number of sensor combinations to monitor one or more parameters associated with the asset 1502. The asset 1502 is in communication with a programmable IoT device (referred to herein for simplicity as the "device") 1504 via an asset-to-device bus 1506. The embodiments described herein focus on a single device 1504. The device 1504 is flexible and can support n-number of sensor combinations to monitor one or more parameters associated with the asset 1502. The parameter(s) to be monitored can be any parameter of the asset 1502 and/or the device 1504 that is/are capable of being monitored by one or more sensors. The sensors can be off-the-shelf sensors or custom sensors built to monitor a specific one or more parameters associated with the asset 1502. As such, the concepts and technologies disclosed herein are not limited to any particular set of parameters to be monitored. By way of example, however, the parameters can be environmental parameters such as temperature or humidity of the asset 1502; security parameters such as when a door opens/closes; or geographical/location parameters such as latitude and longitude coordinates.

The asset-to-device bus 1506 can enable bi-directional communication between the asset 1502 and the device 1504. More particularly, the device 1504 can communicate with a sensor hub 1508 of the asset 1502 to obtain sensor data from any number of asset sensors 1510A-1510N (hereinafter referred to individually as "asset sensor 1510," or collectively as "asset sensors 1510"). The asset sensors 1510 can be associated with the asset 1502 (e.g., installed, attached, or otherwise implemented) so as to monitor different aspects of the asset 1502. The asset sensor(s) 1510, in some embodiments, is/are associated with the asset 1502 as the asset 1502 moves through a supply chain, such as, for example, from manufacturing (or harvesting, mining, or other method of creation or procurement) to warehousing to fleet/shipping and finally to retail or another link in the supply chain. The supply chain may be populated by the various owners of the data collected by the asset 1502 and/or the device 1504 to be sent in the data message 104. In this manner, the asset sensors 1510 can include sensors that monitor/track data that is common among the different verticals in the supply chain. For example, the asset sensors 1510 may include a temperature sensor and/or humidity sensor configured to measure the temperature and/or humidity of the asset 1502 itself or an environment in which the asset 1502 is located.

The asset-to-device bus 1506 can be or can include any interface over which data can be shared between the sensor hub 1508 and the device 1504. The asset-to-device bus 1506, in some embodiments, also can provide power to the sensor hub 1508 in sufficient capacity to enable operation of the asset sensors 1510. Although a power supply is not illustrated, AC and DC power supplies are contemplated, including mains and battery-based implementations. The asset-to-device bus 1506 can be implemented as a wired, wireless, or combined wired/wireless interface. The asset-to-device bus 1506 can utilize any standardized interface such as, but no limited to, serial bus, universal serial bus ("USB"), serial ATA ("SATA"), eSATA, BLUETOOTH, IEEE 11594 ("FIREWIRE"), serial peripheral interface ("SPI"), inter-integrated circuit ("I2C"), WIFI, combinations thereof, and the like. The asset-to-device bus 1506 alternatively can utilize a proprietary interface.

The asset-to-device bus 1506 can be an extension of a device bus 1512 associated with the device 1504. The device bus 1512 can enable communication between components of the device 1504, including a controller 1514, a network module 1516, and any number of device sensors 1518A-1518N (hereinafter referred to individually as "device sensor 1518," or collectively as "device sensors 1518"), and with the sensor hub 1508 that terminates the asset-to-device bus 1506. This allows sensors external to the device 1504, such as the asset sensors 1510 connected to the sensor hub 1508, to be viewed by the device 1504, and more specifically, the controller 1514 of the device 1504, as internal sensors similar to the device sensors 1518. In this manner, the device 1504 can provide additional monitoring/tracking functionality to the asset 1502. Moreover, as noted above, the asset sensors 1510 can be powered by the device 1504 similar to the device sensors 1518 and other components of the device 1504.

The sensor hub 1508 is extensible so that n-number of sensors can be attached externally to the device 1504. The sensor hub 1508 can be associated with an electronic identifier (shown as "asset ID 1520"). The asset ID 1520 is a unique identifier to uniquely identify the asset 1502 among a plurality of other assets (not shown). The format of the asset ID 1520 can include any combination of letters, numbers, symbols, and/or other characters. The asset ID 1520 can be or can include a serial number (or other identifier) associated with the asset 1502. The asset ID 1520 can be in a standardized format or a proprietary format.

The asset sensors 1510 and the device sensors 1518 can be any sensor types. By way of example, and not limitation, the asset sensors 1510 and the device sensors 1518 can be or can include acceleration sensors, acoustic sensors, advanced sensors, alkalinity sensors, ambient sensors, angle sensors, auditory sensors, automation sensors, automotive sensors, barometric sensors, bio sensors, chemical sensors, control sensors, density sensors, depth sensors, directional sensors, displacement sensors, distance sensors, door sensors, electric current sensors, electric potential sensors, flow sensors, fluid sensors, fluid velocity sensors, force sensors, gas sensors, glass sensors, global positioning system ("GPS") sensors, heat sensors, humidity sensors, imaging sensors, industrial sensors, infrared sensors, interface sensors, ionizing sensors, laser sensors, level sensors, light sensors, liquid sensors, magnetic sensors, manufacturing sensors, navigation sensors, optical sensors, pH Sensors, photon sensors, polar sensors, position sensors, pressure sensors, proximity sensors, radar sensors, radiation sensors, radio sensors, shock sensors, smoke sensors, sound sensors, speed sensors, temperature sensors, thermal sensors, ultrasonic sensors, velocity sensors, vibration sensors, yaw sensors, any combinations thereof, and the like. Some examples disclosed herein focus on sensor types such as temperature and humidity sensors. It should be understood that these examples are merely exemplary and should not be construed as being limiting in any way.

Figure 16:
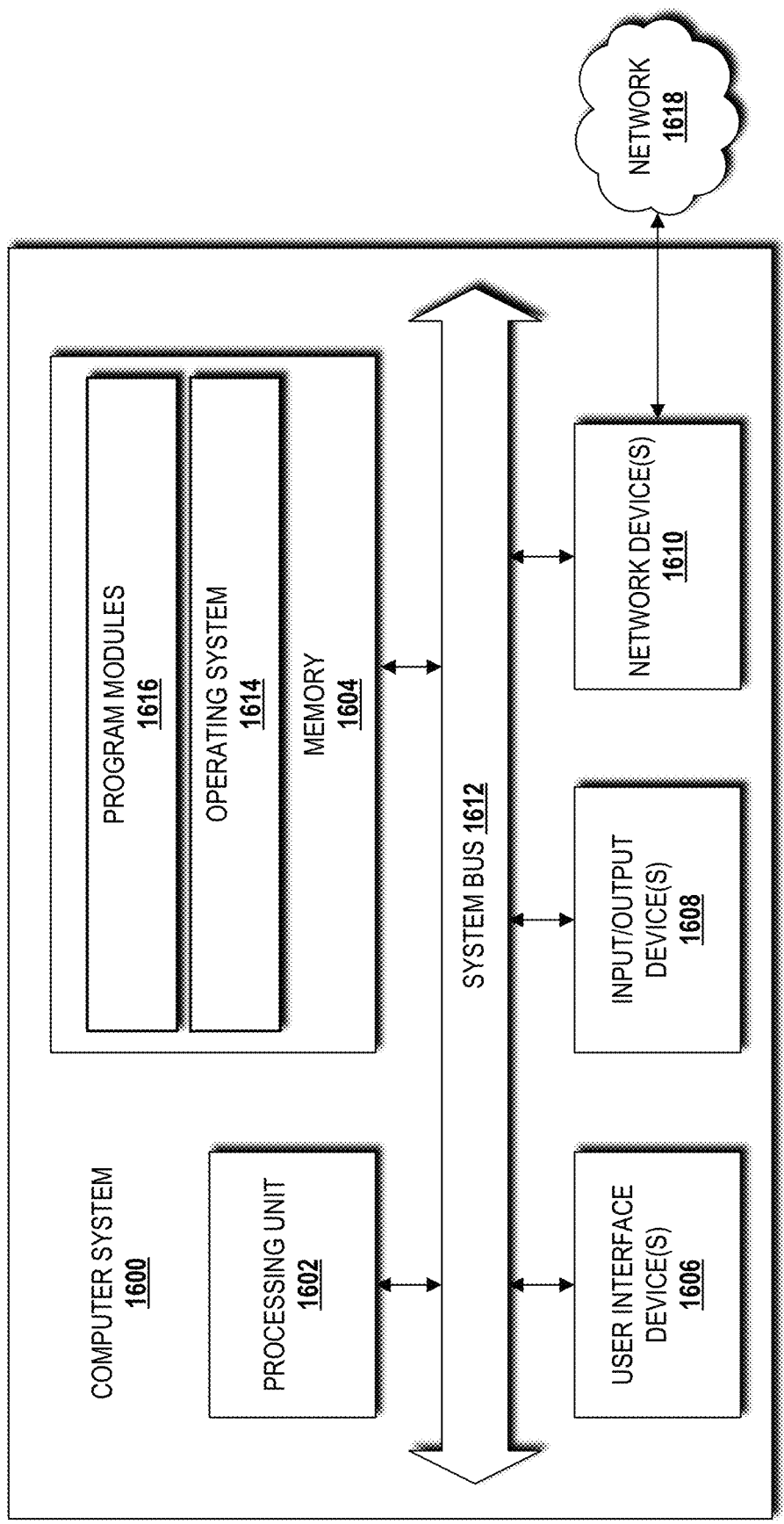
FIG. 16 is a block diagram illustrating an example computer system, according to an illustrative embodiment.

The controller 1514 can control at least some of the functions of the device 1504. The controller 1514 can include one or more processors (an example of which is best shown in FIG. 16), which can be operatively linked and in communication with one or more memory components (also shown in FIG. 16). The processor(s) can execute computer-executable instructions stored in the memory component(s). Execution of the computer-executable instructions can cause the controller 1514 to perform various functions described herein. In some embodiments, the controller 1514 is designed as an integrated circuit, such as a microcontroller, system-on-a-chip, or the like, that includes the processor(s), memory component(s), and input/output components (e.g., the asset-to-device bus 1506 and/or the device bus 1512). In some embodiments, the network module 1516 can be implemented as part of the controller 1514. Those skilled in the art will appreciate the numerous designs suitable for the device 1504 to effectively provide the functionality described herein. Although components of the device 1504 are shown separately in the illustrated embodiment, integration of two or more of these components is contemplated and may be beneficial for some implementations. As such, the illustrated example and other examples described herein for the design of the device 1504 should not be construed as being limiting in any way.

The device 1504 can be associated with a device ID 1522 (e.g., a device serial number or other identifier) that uniquely identifies the device 1504. In the illustrated example, the device ID 1522 is shown as being stored in the controller 1514 (e.g., in a memory component thereof). The device ID 1522 may be stored elsewhere such as, for example, a dedicated memory component that may provide additional security to avoid spoofing or other tampering with the device 1504. The device ID 1522 can be or can include a serial number or any other identifier associated with the device 1504.

Figure 17:
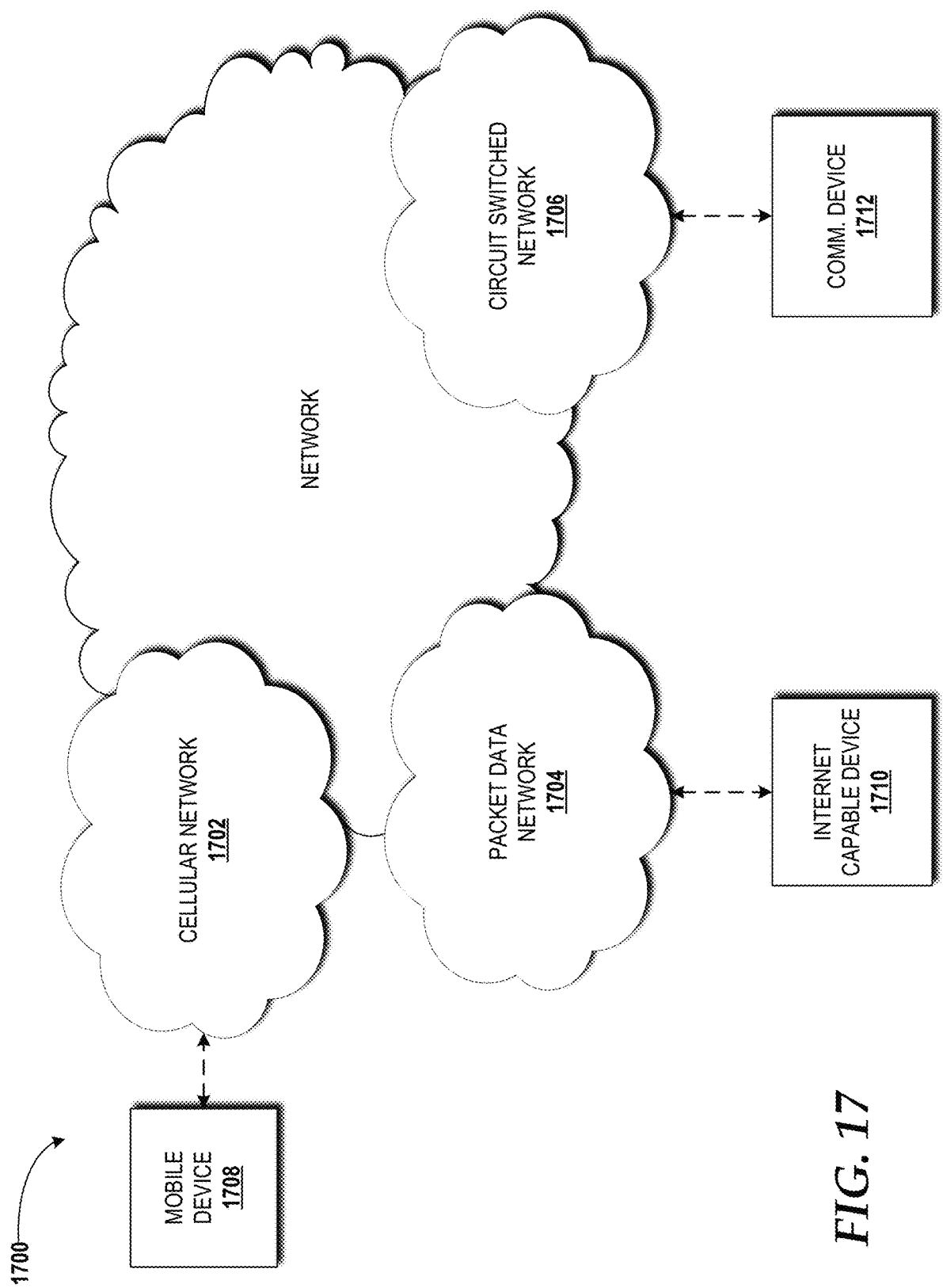
FIG. 17 is a block diagram illustrating a network, according to an illustrative embodiment.

The network module 1516 can be operatively linked and in communication with one or more communications networks (best shown in FIG. 17). The network module 1516 can be or can include a wireless network interface. The network module 1516 can be used to communicate with other devices and/or networks (not shown). In some embodiments, the network module 1516 includes or is otherwise in communication with a subscriber identity module ("SIM") system (not shown). The SIM system can include a universal SIM ("USIM"), a universal integrated circuit card ("UICC"), and/or other identity devices that can be uniquely identified by a SIM ICCID 1524. The SIM system can include and/or can be connected to or inserted into an interface such as a slot interface. In some embodiments, the interface can be configured to accept insertion of other identity cards or modules for accessing various types of networks. Additionally, or alternatively, the interface can be configured to accept multiple subscriber identity cards. The network module 1516 can be associated with its own unique identifier shown as a network module ID 1526 (e.g., a network module serial number). Because other devices and/or modules for identifying users, owners, and/or the device 1504 are contemplated, it should be understood that these embodiments are illustrative, and should not be construed as being limiting in any way.

Turning now to FIG. 16, a block diagram illustrating a computer system 1600 configured to provide the functionality described herein in accordance with various embodiments of the concepts and technologies disclosed herein. In some embodiments, the data source device 102, the network gateway 114, the device gateway 120, the party$_1$ gateway 124, and/or the party$_n$ gateway 128 can be configured like and/or can have an architecture similar or identical to the computer system 1600 described herein with respect to FIG. 16. It should be understood, however, that any of these systems, devices, or elements may or may not include the functionality described herein with reference to FIG. 16.

The computer system 1600 includes a processing unit 1602, a memory 1604, one or more user interface devices 1606, one or more input/output ("I/O") devices 1608, and one or more network devices 1610, each of which is operatively connected to a system bus 1612. The bus 1612 enables bi-directional communication between the processing unit 1602, the memory 1604, the user interface devices 1606, the I/O devices 1608, and the network devices 1610.

The processing unit 1602 may be a standard central processor that performs arithmetic and logical operations, a more specific purpose programmable logic controller ("PLC"), a programmable gate array, or other type of processor known to those skilled in the art and suitable for controlling the operation of the computer system 1600.

The memory 1604 communicates with the processing unit 1602 via the system bus 1612. In some embodiments, the memory 1604 is operatively connected to a memory controller (not shown) that enables communication with the processing unit 1602 via the system bus 1612. The memory 1604 includes an operating system 1614 and one or more program modules 1616. The operating system 1614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 1616 may include various software and/or program modules described herein. By way of example, and not limitation, computer-readable media may include any available computer storage media or communication media that can be accessed by the computer system 1600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1600. In the claims, the phrase "computer storage medium," "computer-readable storage medium," and variations thereof does not include waves or signals per se and/or communication media.

The user interface devices 1606 may include one or more devices with which a user accesses the computer system 1600. The user interface devices 1606 may include, but are not limited to, computers, servers, personal digital assistants, cellular phones, or any suitable computing devices. The I/O devices 1608 enable a user to interface with the program modules 1616. In one embodiment, the I/O devices 1608 are operatively connected to an I/O controller (not shown) that enables communication with the processing unit 1602 via the system bus 1612. The I/O devices 1608 may include one or more input devices, such as, but not limited to, a keyboard, a mouse, or an electronic stylus. Further, the I/O devices 1608 may include one or more output devices, such as, but not limited to, a display screen or a printer to output data.

The network devices 1610 enable the computer system 1600 to communicate with other networks or remote systems via one or more networks, such as a network 1618. Examples of the network devices 1610 include, but are not limited to, a modem, a RF or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a WMAN such a WiMAX network, or a cellular network. Alternatively, the network(s) may be a wired network such as, but not limited to, a WAN such as the Internet, a LAN, a wired PAN, or a wired MAN.

Turning now to FIG. 17, a network 1700 is illustrated, according to an illustrative embodiment. In some embodiments, the network 1618 is configured like the network 1700. Moreover, communications among the data source device 102, the network gateway 114, the device gateway 120, the party$_1$ gateway 124, and the party$_n$ gateway 128 can be handled over the network 1700. The network 1700 includes a cellular network 1702, a packet data network 1704, for example, the Internet, and a circuit switched network 1706, for example, a publicly switched telephone network ("PSTN"). The cellular network 1702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1702 also includes radios and nodes for receiving and transmitting voice, data, and combinations thereof to and from radio transceivers, networks, the packet data network 1704, and the circuit switched network 1706.

A mobile communications device 1708, such as, for example, the data source device 102, the network gateway 114, the device gateway 120, the party$_1$ gateway 124, and/or the party$_n$ gateway 128, a cellular telephone, a user equipment, a mobile terminal, a PDA, a laptop computer, a handheld computer, and combinations thereof, can be operatively connected to the cellular network 1702. The mobile communications device 1708 can be operatively connected to the cellular network 1702. The cellular network 1702 can be configured as a 2G GSM network and can provide data communications via GPRS and/or EDGE. Additionally, or alternatively, the cellular network 1702 can be configured as a 3G UMTS network and can provide data communications via the HSPA protocol family, for example, HSDPA, EUL (also referred to as HSDPA), and HSPA+. The cellular network 1702 also is compatible with 4G mobile communications standards as well as evolved and future mobile standards.

The packet data network 1704 includes various devices, for example, the data source device 102, the network gateway 114, the device gateway 120, the party$_1$ gateway 124, and/or the party$_n$ gateway 128, servers, computers, databases, and other devices in communication with one another, as is generally known. The packet data network 1704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1704 includes or is in communication with the Internet.

The circuit switched network 1706 includes various hardware and software for providing circuit switched communications. The circuit switched network 1706 may include, or may be, what is often referred to as a plain old telephone system ("POTS"). The functionality of a circuit switched network 1706 or other circuit-switched network are generally known and will not be described herein in detail.

The illustrated cellular network 1702 is shown in communication with the packet data network 1704 and a circuit switched network 1706, though it should be appreciated that this is not necessarily the case. One or more Internet-capable devices 1708, for example, the data source device 102, the network gateway 114, the device gateway 120, the party$_1$ gateway 124, and/or the party$_n$ gateway 128, a personal computer ("PC"), a laptop, a portable device, or another suitable device, can communicate with one or more cellular networks 1702, and devices connected thereto, through the packet data network 1704. It also should be appreciated that the Internet-capable device 1710 can communicate with the packet data network 1704 through the circuit switched network 1706, the cellular network 1702, and/or via other networks (not illustrated).

As illustrated, a communications device 1712, for example, a telephone, facsimile machine, modem, computer, or the like, can be in communication with the circuit switched network 1706, and therethrough to the packet data network 1704 and/or the cellular network 1702. It should be appreciated that the communications device 1712 can be an Internet-capable device, and can be substantially similar to the Internet-capable device 1710.

Figure 18:
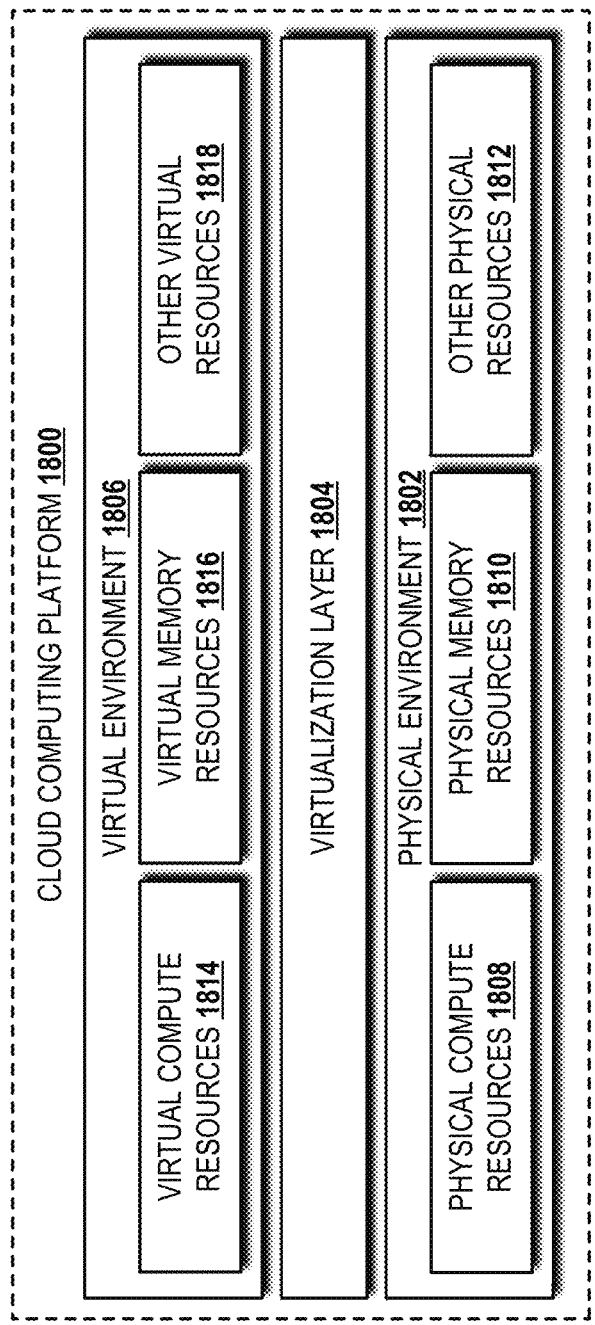
FIG. 18 is a block diagram illustrating an example cloud computing platform, according to an illustrative embodiment.

Turning now to FIG. 18, an illustrative cloud computing platform 1800 will be described, according to an illustrative embodiment. The data source device 102, the network gateway 114, the device gateway 120, the party$_1$ gateway 124, and/or the party$_n$ gateway 128, and/or other networks, systems, and/or devices disclosed herein can be implemented and/or controlled, at least in part, in/by the cloud environment 1800.

The cloud computing platform 1800 includes a physical environment 1802, a virtualization layer 1804, and a virtual environment 1806. While no connections are shown in FIG. 18, it should be understood that some, none, or all of the components illustrated in FIG. 18 can be configured to interact with one other to carry out various functions described herein. In some embodiments, the components are arranged so as to communicate via one or more networks. Thus, it should be understood that FIG. 18 and the remaining description are intended to provide a general understanding of a suitable environment in which various aspects of the embodiments described herein can be implemented, and should not be construed as being limiting in any way.

The physical environment 1802 provides hardware resources that, in the illustrated embodiment, include one or more physical compute resources 1808, one or more physical memory resources 1810, and one or more other physical resources 1812.

The physical compute resource(s) 1808 can include one or more hardware components that perform computations to process data and/or to execute computer-executable instructions of one or more application programs, one or more operating systems, and/or other software. The physical compute resources 1808 can include one or more central processing units ("CPUs") configured with one or more processing cores. The physical compute resources 1808 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 1808 can include one or more discrete GPUs. In some other embodiments, the physical compute resources 1808 can include CPU and GPU components that are configured in accordance with a co-processing CPU/GPU computing model, wherein the sequential part of an application executes on the CPU and the computationally-intensive part is accelerated by the GPU processing capabilities. The physical compute resources 1808 can include one or more system-on-chip ("SoC") components along with one or more other components, including, for example, one or more of the physical memory resources 1810, and/or one or more of the other physical resources 1812. In some embodiments, the physical compute resources 1808 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The physical compute resources 1808 can be or can include one or more hardware components architected in accordance with an ARM architecture, available for license from ARM HOLDINGS of Cambridge, United Kingdom. Alternatively, the physical compute resources 1808 can be or can include one or more hardware components architected in accordance with an x86 architecture, such an architecture available from INTEL CORPORATION of Mountain View, Calif., and others. Those skilled in the art will appreciate the implementation of the physical compute resources 1808 can utilize various computation architectures, and as such, the physical compute resources 1808 should not be construed as being limited to any particular computation architecture or combination of computation architectures, including those explicitly disclosed herein.

The physical memory resource(s) 1810 can include one or more hardware components that perform storage/memory operations, including temporary or permanent storage operations. In some embodiments, the physical memory resource(s) 1810 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 1808.

The other physical resource(s) 1812 can include any other hardware resources that can be utilized by the physical compute resources(s) 1808 and/or the physical memory resource(s) 1810 to perform operations described herein. The other physical resource(s) 1812 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 1802 can be virtualized by one or more virtual machine monitors (not shown; also known as "hypervisors") operating within the virtualization/control layer 1804 to create virtual resources that reside in the virtual environment 1806. The virtual machine monitors can be or can include software, firmware, and/or hardware that alone or in combination with other software, firmware, and/or hardware, creates and manages virtual resources operating within the virtual environment 1806.

The virtual resources operating within the virtual environment 1806 can include abstractions of at least a portion of the physical compute resources 1808, the physical memory resources 1810, and/or the other physical resources 1812, or any combination thereof, shown as virtual compute resources 1814, virtual memory resources 1816, and other virtual resources 1818, respectively. In some embodiments, the abstractions can include one or more virtual machines upon which one or more applications can be executed.

Figure 19:
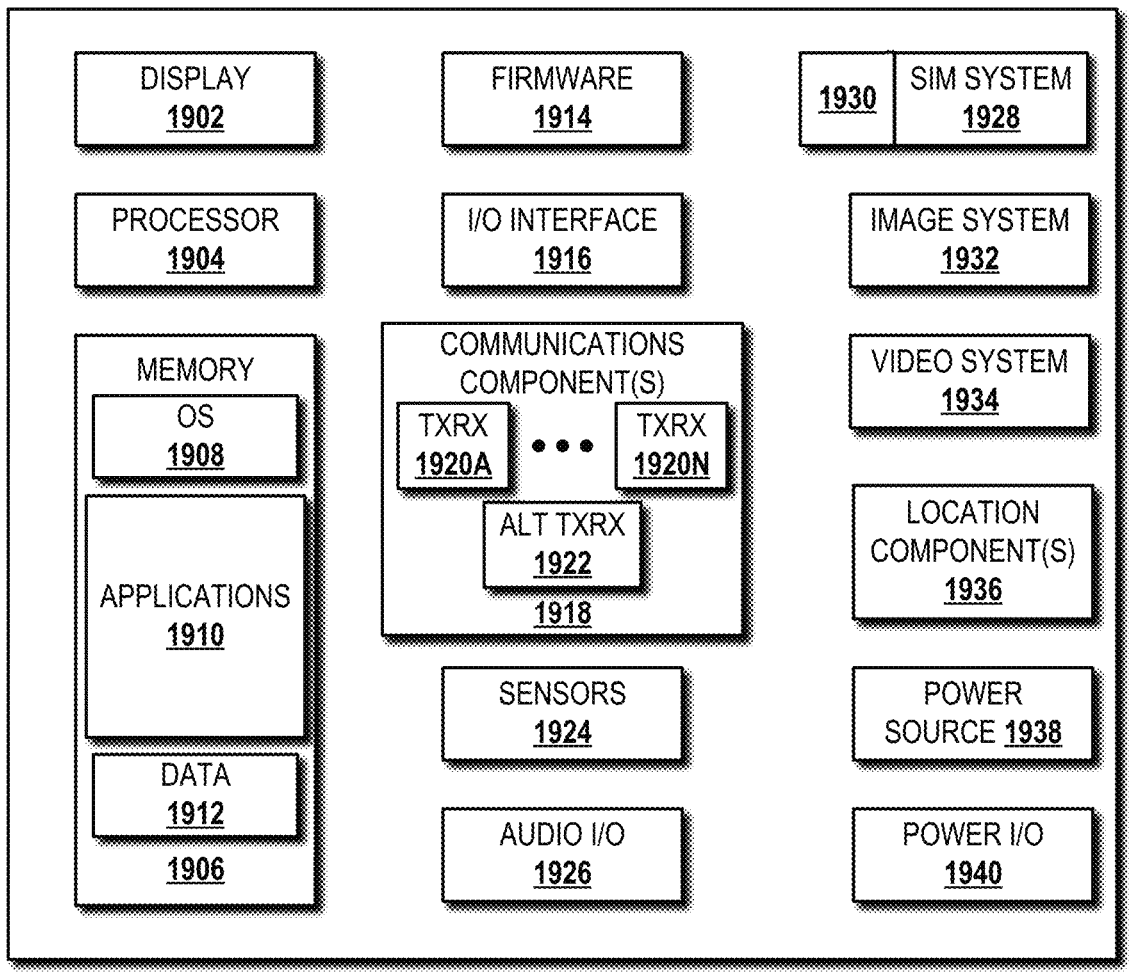
FIG. 19 is a block diagram illustrating an example mobile device and components thereof, according to an illustrative embodiment.

Turning now to FIG. 19, an illustrative mobile device 1900 and components thereof will be described. In some embodiments, the data source device 102, the network gateway 114, the device gateway 120, the party$_1$ gateway 124, and/or the party$_n$ gateway 128 described above with reference to FIG. 1A can be configured as and/or can have an architecture similar or identical to the mobile device 1900 described herein in FIG. 19. While connections are not shown between the various components illustrated in FIG. 19, it should be understood that some, none, or all of the components illustrated in FIG. 19 can be configured to interact with one another to carry out various device functions. In some embodiments, the components are arranged so as to communicate via one or more busses (not shown). Thus, it should be understood that FIG. 19 and the following description are intended to provide a general understanding of a suitable environment in which various aspects of embodiments can be implemented, and should not be construed as being limiting in any way.

As illustrated in FIG. 19, the mobile device 1900 can include a display 1902 for displaying data. According to various embodiments, the display 1902 can be configured to display data described herein, network connection information, various GUI elements, text, images, video, virtual keypads and/or keyboards, messaging data, notification messages, metadata, Internet content, device status, time, date, calendar data, device preferences, map and location data, combinations thereof, and/or the like. The mobile device 1900 also can include a processor 1904 and a memory or other data storage device ("memory") 1906. The processor 1904 can be configured to process data and/or can execute computer-executable instructions stored in the memory 1906. The computer-executable instructions executed by the processor 1904 can include, for example, an operating system 1908, one or more applications 1910, other computer-executable instructions stored in the memory 1906, or the like. In some embodiments, the applications 1910 also can include a UI application (not illustrated in FIG. 19).

The UI application can interface with the operating system 1908 to facilitate user interaction with functionality and/or data stored at the mobile device 1900 and/or stored elsewhere. In some embodiments, the operating system 1908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1904 to aid a user in data communications, entering/deleting data, entering and setting user IDs and passwords for device access, configuring settings, manipulating content and/or settings, multimode interaction, interacting with other applications 1910, and otherwise facilitating user interaction with the operating system 1908, the applications 1910, and/or other types or instances of data 1912 that can be stored at the mobile device 1900.

The applications 1910, the data 1912, and/or portions thereof can be stored in the memory 1906 and/or in a firmware 1914, and can be executed by the processor 1904. The firmware 1914 also can store code for execution during device power up and power down operations. It can be appreciated that the firmware 1914 can be stored in a volatile or non-volatile data storage device including, but not limited to, the memory 1906 and/or a portion thereof.

The mobile device 1900 also can include an input/output ("I/O") interface 1916. The I/O interface 1916 can be configured to support the input/output of data such as location information, presence status information, user IDs, passwords, and application initiation (start-up) requests. In some embodiments, the I/O interface 1916 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 1900 can be configured to synchronize with another device to transfer content to and/or from the mobile device 1900. In some embodiments, the mobile device 1900 can be configured to receive updates to one or more of the applications 1910 via the I/O interface 1916, though this is not necessarily the case. In some embodiments, the I/O interface 1916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1916 may be used for communications between the mobile device 1900 and a network device or local device.

The mobile device 1900 also can include a communications component 1918. The communications component 1918 can be configured to interface with the processor 1904 to facilitate wired and/or wireless communications with one or more networks. In some embodiments, the communications component 1918 includes a multimode communications subsystem for facilitating communications via the cellular network and one or more other networks.

The communications component 1918, in some embodiments, includes one or more transceivers. The one or more transceivers, if included, can be configured to communicate over the same and/or different wireless technology standards with respect to one another. For example, in some embodiments, one or more of the transceivers of the communications component 1918 may be configured to communicate using GSM, CDMAONE, CDMA2000, LTE, and various other 2G, 2.5G, 3G, 4G, 4.5G, 5G, and greater generation technology standards. Moreover, the communications component 1918 may facilitate communications over various channel access methods (which may or may not be used by the aforementioned standards) including, but not limited to, TDMA, FDMA, W-CDMA, OFDM, SDMA, and the like.

In addition, the communications component 1918 may facilitate data communications using GPRS, EDGE, the HSPA protocol family including HSDPA, EUL or otherwise termed HSDPA, HSPA+, and various other current and future wireless data access standards. In the illustrated embodiment, the communications component 1918 can include a first transceiver ("TxRx") 1920A that can operate in a first communications mode (e.g., GSM). The communications component 1918 also can include an Nth transceiver ("TxRx") 1920N that can operate in a second communications mode relative to the first transceiver 1920A (e.g., UMTS). While two transceivers 1920A-1920N (hereinafter collectively and/or generically referred to as "transceivers 1920") are shown in FIG. 19, it should be appreciated that less than two, two, and/or more than two transceivers 1920 can be included in the communications component 1918.

The communications component 1918 also can include an alternative transceiver ("Alt TxRx") 1922 for supporting other types and/or standards of communications. According to various contemplated embodiments, the alternative transceiver 1922 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 1918 also can facilitate reception from terrestrial radio networks, digital satellite radio networks, internet-based radio service networks, combinations thereof, and the like. The communications component 1918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1900 also can include one or more sensors 1924. The sensors 1924 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 1900 may be provided by an audio I/O component 1926. The audio I/O component 1926 of the mobile device 1900 can include one or more speakers for the output of audio signals, one or more microphones for the collection and/or input of audio signals, and/or other audio input and/or output devices.

The illustrated mobile device 1900 also can include a subscriber identity module ("SIM") system 1928. The SIM system 1928 can include a universal SIM ("USIM"), a universal integrated circuit card ("UICC") and/or other identity devices. The SIM system 1928 can include and/or can be connected to or inserted into an interface such as a slot interface 1930. In some embodiments, the slot interface 1930 can be configured to accept insertion of other identity cards or modules for accessing various types of networks. Additionally, or alternatively, the slot interface 1930 can be configured to accept multiple subscriber identity cards. Because other devices and/or modules for identifying users and/or the mobile device 1900 are contemplated, it should be understood that these embodiments are illustrative, and should not be construed as being limiting in any way.

The mobile device 1900 also can include an image capture and processing system 1932 ("image system"). The image system 1932 can be configured to capture or otherwise obtain photos, videos, and/or other visual information. As such, the image system 1932 can include cameras, lenses, charge-coupled devices ("CCDs"), combinations thereof, or the like. The mobile device 1900 may also include a video system 1934. The video system 1934 can be configured to capture, process, record, modify, and/or store video content. Photos and videos obtained using the image system 1932 and the video system 1934, respectively, may be added as message content to an MMS message, email message, and sent to another device. The video and/or photo content also can be shared with other devices via various types of data transfers via wired and/or wireless communication devices as described herein.

The mobile device 1900 also can include one or more location components 1936. The location components 1936 can be configured to send and/or receive signals to determine a geographic location of the mobile device 1900. According to various embodiments, the location components 1936 can send and/or receive signals from global positioning system ("GPS") devices, assisted-GPS ("A-GPS") devices, WI-FI/WIMAX and/or cellular network triangulation data, combinations thereof, and the like. The location component 1936 also can be configured to communicate with the communications component 1918 to retrieve triangulation data for determining a location of the mobile device 1900. In some embodiments, the location component 1936 can interface with cellular network nodes, telephone lines, satellites, location transmitters and/or beacons, wireless network transmitters and receivers, combinations thereof, and the like. In some embodiments, the location component 1936 can include and/or can communicate with one or more of the sensors 1924 such as a compass, an accelerometer, and/or a gyroscope to determine the orientation of the mobile device 1900. Using the location component 1936, the mobile device 1900 can generate and/or receive data to identify its geographic location, or to transmit data used by other devices to determine the location of the mobile device 1900. The location component 1936 may include multiple components for determining the location and/or orientation of the mobile device 1900.

The illustrated mobile device 1900 also can include a power source 1938. The power source 1938 can include one or more batteries, power supplies, power cells, and/or other power subsystems including alternating current ("AC") and/or direct current ("DC") power devices. The power source 1938 also can interface with an external power system or charging equipment via a power I/O component 1940. Because the mobile device 1900 can include additional and/or alternative components, the above embodiment should be understood as being illustrative of one possible operating environment for various embodiments of the concepts and technologies described herein. The described embodiment of the mobile device 1900 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 1900 or other devices or computers described herein, such as the computer system 1600 described above with reference to FIG. 19. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 1900 in order to store and execute the software components presented herein. It is also contemplated that the mobile device 1900 may not include all of the components shown in FIG. 19, may include other components that are not explicitly shown in FIG. 19, or may utilize an architecture completely different than that shown in FIG. 19.

Based on the foregoing, it should be appreciated that aspects of a zero-knowledge proof network protocol for n-party verification of data has been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
    generating, by a data source device comprising a processor, a plurality of data segments, wherein each data segment of the plurality of data segments comprises data that is owned by a specific entity;
    calculating, by the data source device, a hash for each data segment of the plurality of data segments;
    storing, by the data source device, the hash for each data segment of the plurality of data segments as part of a message footer of a data message;
    calculating, by the data source device, a further hash comprising a combination of the plurality of data segments and the hash for each data segment of the plurality of data segments;
    storing, by the data source device, the further hash as part of the message footer of the data message;
    encrypting, by the data source device, each data segment of the plurality of data segments to create a plurality of encrypted data segments;
    assembling, by the data source device, the data message comprising the plurality of encrypted data segments and the message footer; and
    sending, by the data source device, the data message to a gateway.

2. The method of claim 1, wherein the specific entity comprises a network owner, a device owner, or a third party owner.

3. The method of claim 2, wherein generating, by the data source device, the plurality of data segments comprises generating, by the data source device, the plurality of data segments based upon output from at least one sensor of the data source device.

4. The method of claim 3, wherein the data source device comprises an IoT device.

5. The method of claim 3, wherein the data source device comprises a combination of an IoT device and an asset.

6. The method of claim 1, wherein the plurality of data segments comprises a first data segment associated with a network owner, a second data segment associated with a device owner, and a third data segment associated with a third party owner.

7. The method of claim 6, wherein the gateway comprises a network gateway associated with the network owner; and further comprising:
    decrypting, by the network gateway, using a first key, a first encrypted data segment associated with the network owner to obtain the first data segment;
    sending, by the network gateway, a modified data message to a device gateway, wherein the modified data message comprises the further hash and a second encrypted data segment associated with the device owner and a third encrypted data segment associated with the third party owner;
    decrypting, by the device gateway, using a second key, the second encrypted data segment associated with the device owner to obtain the second data segment;
    sending, by the device gateway, a second modified data message to a third party gateway, wherein the second modified data message comprises the further hash and the third encrypted data segment associated with the third party owner; and
    decrypting, by the third party gateway, using a third key, the third encrypted data segment associated with the third party owner to obtain the third data segment.

8. The method of claim 7, further comprising verifying an integrity of the data message, the modified data message, and the second modified data message.

9. A computer-readable storage medium comprising computer-executable instructions that, when executed, cause a processor of a data source device to perform operations comprising:
    generating a plurality of data segments, wherein each data segment of the plurality of data segments comprises data that is owned by a specific entity;
    calculating a hash for each data segment of the plurality of data segments;
    storing the hash for each data segment of the plurality of data segments as part of a message footer of a data message;
    calculating a further hash comprising a combination of the plurality of data segments and the hash for each data segment of the plurality of data segments;

storing the further hash as part of the message footer of the data message;

encrypting each data segment of the plurality of data segments to create a plurality of encrypted data segments;

assembling the data message comprising the plurality of encrypted data segments and the message footer; and sending the data message to a gateway.

10. The computer-readable storage medium of claim 9, wherein generating the plurality of data segments comprises generating the plurality of data segments based upon output from at least one sensor of the data source device.

11. The computer-readable storage medium of claim 10, wherein the data source device comprises an IoT device.

12. The computer-readable storage medium of claim 10, wherein the data source device comprises a combination of an IoT device and an asset.

13. The computer-readable storage medium of claim 9, wherein the plurality of data segments comprises a first data segment associated with a network owner, a second data segment associated with a device owner, and a third data segment associated with a third party owner.

14. A data source device comprising:

a processor; and a memory comprising instructions that, when executed by the processor, cause the processor to perform operations comprising generating a plurality of data segments, wherein each data segment of the plurality of data segments comprises data that is owned by a specific entity, calculating a hash for each data segment of the plurality of data segments, storing the hash for each data segment of the plurality of data segments as part of a message footer of a data message, calculating a further hash comprising a combination of the plurality of data segments and the hash for each data segment of the plurality of data segments, storing the further hash as part of the message footer of the data message, encrypting each data segment of the plurality of data segments to create a plurality of encrypted data segments, assembling, by the data source device, the data message comprising the plurality of encrypted data segments and the message footer, and sending the data message to a gateway.

15. The data source device of claim 14, wherein the specific entity comprises a network owner, a device owner, or a third party owner.

16. The data source device of claim 15, further comprising a sensor; and wherein generating the plurality of data segments comprises generating the plurality of data segments based upon output from the sensor.

17. The data source device of claim 16, wherein the data source device comprises an IoT device.

18. The data source device of claim 16, wherein the data source device comprises a combination of an IoT device and an asset.

19. The data source device of claim 14, wherein the plurality of data segments comprises a first data segment associated with a network owner, a second data segment associated with a device owner, and a third data segment associated with a third party owner.

20. The data source device of claim 19, wherein the plurality of data segments further comprises a fourth data segment associated with a further third party owner.

* * * * *